US012726607B2

(12) United States Patent
Tsai et al.

(10) Patent No.: US 12,726,607 B2
(45) Date of Patent: Sep. 1, 2026

(54) CROSS-COMPONENT LINEAR MODEL PREDICTION

(71) Applicant: MEDIATEK INC., Hsinchu City (TW)

(72) Inventors: Chia-Ming Tsai, Hsinchu City (TW); Chun-Chia Chen, Hsinchu City (TW); Yu-Ling Hsiao, Hsinchu City (TW); Man-Shu Chiang, Hsinchu City (TW); Chih-Wei Hsu, Hsinchu City (TW); Olena Chubach, San Jose, CA (US); Tzu-Der Chuang, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 11 days.

(21) Appl. No.: 18/721,354

(22) PCT Filed: Dec. 29, 2022

(86) PCT No.: PCT/CN2022/143254
§ 371 (c)(1),
(2) Date: Jun. 18, 2024

(87) PCT Pub. No.: WO2023/125771
PCT Pub. Date: Jul. 6, 2023

(65) Prior Publication Data

US 2025/0039356 A1 Jan. 30, 2025

Related U.S. Application Data

(60) Provisional application No. 63/294,429, filed on Dec. 29, 2021.

(51) Int. Cl.

| | |
|---|---|
| ***H04N 19/103*** | (2014.01) |
| ***H04N 19/176*** | (2014.01) |
| ***H04N 19/186*** | (2014.01) |

(52) U.S. Cl.
CPC ......... *H04N 19/103* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 9,307,237 | B2 | 4/2016 | Liu | |
| 10,873,746 | B2 * | 12/2020 | Ikai | H04N 19/70 |

(Continued)

FOREIGN PATENT DOCUMENTS

| | | | |
|---|---|---|---|
| CN | 104380741 | A | 2/2015 |
| CN | 109417623 | A | 3/2019 |

(Continued)

OTHER PUBLICATIONS

International Search Report and Written Opinion dated Feb. 22, 2023, issued in application No. PCT/CN2022/143254.

(Continued)

*Primary Examiner* — Nam D Pham
(74) *Attorney, Agent, or Firm* — McClure, Qualey & Rodack, LLP

(57) ABSTRACT

A video coding system that uses multiple models to predict chroma samples is provided. The video coding system receives data for a block of pixels to be encoded or decoded as a current block of a current picture of a video. The video coding system derives multiple prediction linear models based on luma and chroma samples neighboring the current block. The video coding system constructs a composite linear model based on the multiple prediction linear models. The video coding system applies the composite linear model to incoming or reconstructed luma samples of the current block to generate a chroma predictor of the current block. The video coding system uses the chroma predictor to (Continued)

reconstruct chroma samples of the current block or to encode the current block.

18 Claims, 15 Drawing Sheets

(56) References Cited

U.S. PATENT DOCUMENTS

| | | | |
|---|---|---|---|
| 11,943,451 | B2 | 3/2024 | Ma |
| 2018/0288439 | A1 | 10/2018 | Hsu |
| 2019/0045184 | A1 | 2/2019 | Zhang |

FOREIGN PATENT DOCUMENTS

| | | | |
|---|---|---|---|
| CN | 110858903 | A | 3/2020 |
| CN | 111405287 | A | 7/2020 |
| WO | 2018053293 | A1 | 3/2018 |
| WO | 2019031703 | A1 | 2/2019 |
| WO | 2020096877 | A1 | 5/2020 |

OTHER PUBLICATIONS

Chinese language office action dated Oct. 24, 2023, issued in application No. TW 111150575.

Extended European Search Report dated Oct. 10, 2025, issued in application No. EP 22915021.4.

Van Der Auwera, G., et al.; "Description of Core Experiment 3 (CE3): Intra Prediction and Mode Coding;" Joint Video Experts Team (JVET) of ITU-T SG 16 WP 3 and ISO/IEC JTC 1/SC 29/ WG 11; Apr. 2018; pp. 1-44.

Zhang, K., et al.; "Multi-model based cross-component linear model chroma intra-prediction for video coding;" VCIP; Dec. 2017; pp. 1 1-4.

Zhang, K., et al.; "Segmental Prediction for Video Coding;" IEEE Transactions on Circuits and Systems for Video Technology; vol. 27; No. 11; Nov. 2017; pp. 2425-2436.

* cited by examiner

CROSS-COMPONENT LINEAR MODEL PREDICTION

CROSS REFERENCE TO RELATED PATENT APPLICATION(S)

The present disclosure is part of a non-provisional application that claims the priority benefit of U.S. Provisional Patent Application No. 63/294,429, filed on 29 Dec. 2021. Content of above-listed application is herein incorporated by reference.

TECHNICAL FIELD

The present disclosure relates generally to video coding. In particular, the present disclosure relates to cross-component linear model prediction (CCLM).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile Video Coding (VVC) is a codec designed to meet upcoming needs in videoconferencing, over-the-top streaming, mobile telephony, etc. VVC is meant to be very versatile and address all the video needs from low resolution and low bitrates to high resolution and high bitrates, high dynamic range (HDR), 360 omnidirectional, etc. VVC supports YCbCr color spaces with 4:2:0 sampling, 10 bits per component, YCbCr/RGB 4:4:4 and YCbCr 4:2:2, with bit depths up to 16 bits per component, with HDR and wide-gamut color, along with auxiliary channels for transparency, depth, and more.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding system that uses multiple models to predict chroma samples is provided. The video coding system receives data for a block of pixels to be encoded or decoded as a current block of a current picture of a video. The video coding system derives multiple prediction linear models based on luma and chroma samples neighboring the current block. The video coding system constructs a composite linear model based on the multiple prediction linear models. The parameters of the composite linear model are derived from the parameters of the multiple prediction linear models. The video coding system applies the composite linear model to incoming or reconstructed luma samples of the current block to generate a chroma predictor of the current block. The video coding system uses the chroma predictor to reconstruct chroma samples of the current block or to encode the current block.

In some embodiments, the video coding system may select a prediction linear model from the multiple prediction linear models and use the parameters of the selected prediction linear model as the parameters of the composite linear model. In some embodiments, the selected prediction linear model has a best boundary similarity among the multiple prediction linear models. The boundary similarity of a prediction linear model may be computed by comparing (i) reconstructed chroma samples neighboring the current block and (ii) boundary samples of a chroma predictor produced by the prediction linear model base on the luma samples of the current block.

In some embodiments, multiple lines of neighboring pixels of the current block are used to provide samples for deriving the parameters of the composite linear model. Each line of the multiple lines of neighboring pixels is used to derive one prediction linear model of the plurality of prediction linear models. The parameters of the composite linear model may be derived by averaging the parameters of the multiple prediction linear models. The video coding system may signal the selection of one of the multiple lines, and the prediction linear model derived from the selected line of neighboring pixels is used as the composite linear model.

In some embodiments, pixels are classified into different groups according to pixel magnitudes, and the multiple prediction linear models are correspondingly derived for the different magnitude groups. In some embodiments, neighboring pixels of the current block are partitioned into multiple segments according to a set of segmentation information, and the multiple prediction linear models include linear models that are derived based on the multiple segments. The video coding system may pre-process the luma and chroma samples before deriving the multiple prediction linear models.

In some embodiments, the multiple prediction linear models include a linear model that is derived based on distances to top and/or left boundaries of the current block. In some embodiments, in a hybrid mode, the multiple prediction linear models are constructed for a first chroma component of the current block, while only one prediction linear model is constructed for a second chroma component of the current block. In some embodiments, the parameters of the multiple prediction linear models are derived based on multiple different luma blocks.

In some embodiments, the video coding system may post-process the chroma predictor before using the chroma predictor to reconstruct chroma samples of the current block or to encode the current block. In some embodiments, a first region of the current block is coded by using the chroma predictor and a second region of the current block is coded by using inter-prediction. In some embodiments, the first and second regions are identified based on luma residual samples of the current block.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
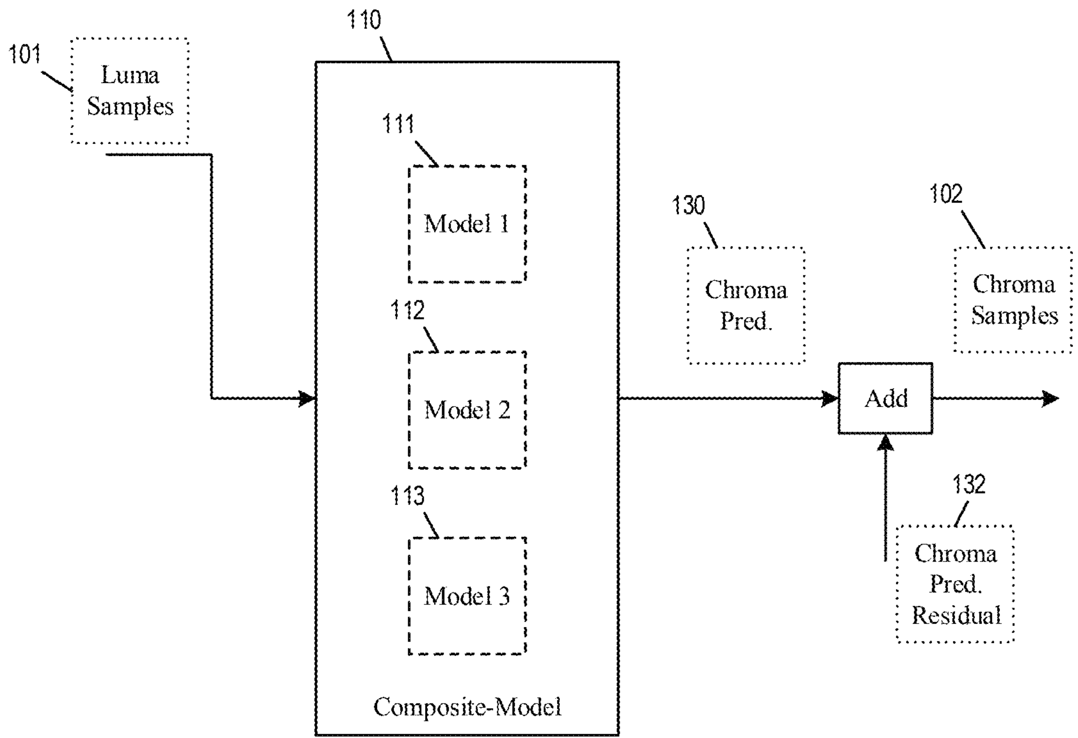
FIG. 1 conceptually illustrates multi-model CCLM prediction in a video coder.
Figure 1:
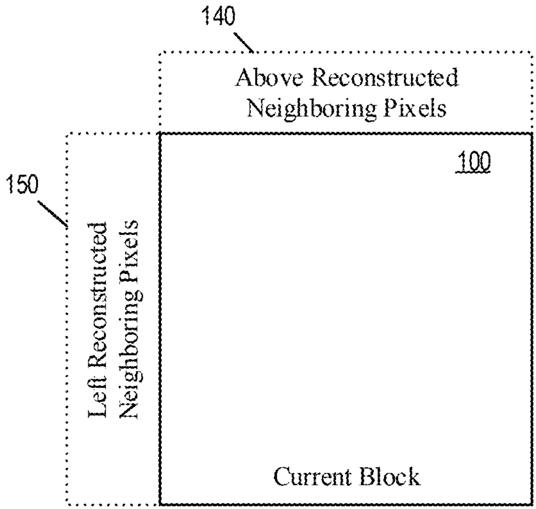

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross Component Linear Model (CCLM)

Cross Component Linear Model (CCLM) or Linear Model (LM) mode is a cross component prediction mode in which chroma components of a block is predicted from the collocated reconstructed luma samples by linear models. The parameters (e.g., scale and offset) of the linear model are derived from already reconstructed luma and chroma samples that are adjacent to the block. For example, in VVC, the CCLM mode makes use of inter-channel dependencies to predict the chroma samples from reconstructed luma samples. This prediction is carried out using a linear model in the form of:

$$P(i, j) = \alpha \cdot rec'_L(i, j) + \beta \quad \text{eq. (1)}$$

P(i, j) in eq. (1) represents the predicted chroma samples in a CU (or the predicted chroma samples of the current CU) and $$rec'_L(i, j)$$

represents the down-sampled reconstructed luma samples of the same CU (or the corresponding reconstructed luma samples of the current CU).

The CCLM model parameters α (scaling parameter) and β (offset parameter) are derived based on at most four neighboring chroma samples and their corresponding down-sampled luma samples. In LM_A mode (also denoted as LM-T mode), only the above or top-neighboring template is used to calculate the linear model coefficients. In LM_L mode (also denoted as LM-L mode), only left template is used to calculate the linear model coefficients. In LM-LA mode (also denoted as LM-LT mode), both left and above templates are used to calculate the linear model coefficients.

Suppose the current chroma block dimensions are W×H, then W' and H' are set as

W'=W, H'=H when LM-LT mode is applied;

W'=W+H when LM-T mode is applied;

H'=H+W when LM-L mode is applied

The above neighboring positions are denoted as S[0, −1] . . . S[W'−1, −1] and the left neighboring positions are denoted as S[−1, 0] . . . S[−1, H'−1]. Then the four samples are selected as

- S[W'/4, −1], S[3*W'/4, −1], S[−1, H'/4], S[−1, 3*H'/4] when LM mode is applied (both above and left neighboring samples are available);
- S[W'/8, −1], S[3*W'/8, −1], S[5*W'/8, −1], S[7*W'/8, −1] when LM-T mode is applied (only the above neighboring samples are available);
- S[−1, H'/8], S[−1, 3*H'/8], S[−1, 5*H'/8], S[−1, 7*H'/8] when LM-L mode is applied (only the left neighboring samples are available);

The four neighboring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $X_A$, $X_B$, $Y_A$ and $Y_B$ are derived as:

$$X_a = (x_A^0 + x_A^1 + 1) \gg 1; X_b = (x_B^0 + x_B^1 + 1) \gg 1; \quad \text{eq. (2)}$$

$$Y_a = (y_A^0 + y_A^1 + 1) \gg 1; Y_b = (y_B^0 + y_B^1 + 1) \gg 1 \quad \text{eq. (3)}$$

The linear model parameters α and β are obtained according to the following equations $$\alpha = \frac{Y_a - Y_b}{X_a - X_b} \quad \text{eq. (4)}$$

$$\beta = Y_b - \alpha \cdot X_b \quad \text{eq. (5)}$$

The operations to calculate the α and β parameters according to eq. (4) and (5) may be implemented by a look-up table. In some embodiments, to reduce the memory required for storing the look-up table, the diff value (difference between maximum and minimum values) and the parameter α are expressed by an exponential notation. For example, diff is approximated with a 4-bit significant part and an exponent. Consequently, the table for 1/diff is reduced to 16 elements for 16 values of the significand as follows:

$$DivTable[\,] = \{0, 7, 6, 5, 5, 4, 4, 3, 3, 2, 2, 1, 1, 1, 1, 0\} \quad \text{eq. (6)}$$

This reduces the complexity of the calculation as well as the memory size required for storing the needed tables.

In some embodiments, to get more samples for calculating the CCLM model parameters α and β, the above template is extended to contain (W+H) samples for LM-T mode, the left template is extended to contain (H+W) samples for LM-L mode. For LM-LT mode, both the extended left template and the extended above templates are used to calculate the linear model coefficients.

To match the chroma sample locations for 4:2:0 video sequences, two types of down-sampling filters are applied to luma samples to achieve 2 to 1 down-sampling ratio in both horizontal and vertical directions. The selection of down-sampling filter is specified by a sequence parameter set (SPS) level flag. The two down-sampling filters are as follows, which correspond to "type-0" and "type-2" content, respectively.

$$rec'_L(i,j) = [rec_L(2i-1,2j-1) + 2j-1) + 2*rec_L(2i-1,2j-1) + rec_L(2i+1,2j-1) + rec_L(2i-1,2j) + rec_L(2i+1,2j) + 4] \gg 3 \quad \text{eq. (7)}$$

$$rec'_L(i,j) = [rec_L(2i,2j-1) + rec_L(2i-1,2j) + 4*rec_L(2i,2j) + rec_L(2i+1,2j) + rec_L(2i,2j+1) + 4] \gg 3 \quad \text{eq. (8)}$$

In some embodiments, only one luma line (general line buffer in intra prediction) is used to make the down-sampled luma samples when the upper reference line is at the CTU boundary.

In some embodiments, the α and β parameters computation is performed as part of the decoding process, and is not just as an encoder search operation. As a result, no syntax is used to convey the α and β values to decoder.

For chroma intra mode coding, a total of 8 intra modes are allowed. Those modes include five traditional intra modes and three cross-component linear model modes (LM_LA, LM_A, and LM_L). Chroma mode coding directly depends on the intra prediction mode of the corresponding luma block. Chroma (intra) mode signaling and corresponding luma intra prediction modes are according to the following table:

| Chroma Intra Prediction | Corresponding Luma Intra Prediction Mode | | | | |
|---|---|---|---|---|---|
| Mode | 0 | 50 | 18 | 1 | X (0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Since separate block partitioning structure for luma and chroma components is enabled in I slices, one chroma block may correspond to multiple luma blocks. Therefore, for chroma derived mode (DM) mode, the intra prediction mode of the corresponding luma block covering the center position of the current chroma block is directly inherited.

A single unified binarization table (mapping to bin string) is used for chroma intra prediction mode according to the following table:

| Chroma intra prediction mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In the Table, the first bin indicates whether it is regular (0) or LM mode (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in the table are context coded with its own context model, and the rest bins are bypass coded.

In addition, in order to reduce luma-chroma latency in dual tree, when the 64×64 luma coding tree node is not split (and ISP is not used for the 64×64 CU) or partitioned with QT, the chroma CUs in 32×32/32×16 chroma coding tree node are allowed to use CCLM in the following way:

- If the 32×32 chroma node is not split or partitioned with QT split, all chroma CUs in the 32×32 node can use CCLM
- If the 32×32 chroma node is partitioned with Horizontal BT, and the 32×16 child node does not split or uses Vertical BT split, all chroma CUs in the 32×16 chroma node can use CCLM.
- In all the other luma and chroma coding tree split conditions, CCLM is not allowed for chroma CU.

II. Multi-Model CCLM

Some embodiments of the disclosure provide a multi-model CCLM mode, according to which a video encoder or decoder generates multiple CCLM models for a block of pixels currently being encoded or decoded (current block). The CCLM models are used to generate a chroma predictor (or prediction samples of a chroma component) based on the luma component. FIG. 1 conceptually illustrates multi-model CCLM prediction in a video coder. As illustrated, for a current block 100 including luma samples 101 and chroma samples 102, and the chroma samples 102 are to be coded by applying a composite linear model 110 to the luma samples 101. The parameters (e.g., a and R) of the composite linear model 110 are derived from the parameters of multiple different linear models 111-113. The composite linear model 110 produces a chroma predictor 130 for the current block. Adding the chroma predictor 130 with chroma residual 132 reconstitutes the chroma samples 102 of current block. The data flow of the example may be replicated for Cr and Cb components.

The multiple CCLM models 111-113 are derived based on luma and chroma samples in reconstructed neighboring pixels 140 above the current block 100 and/or reconstructed neighboring pixels 150 left of the current block 100. In some embodiments, the multiple different models 111-113 may be generated based on different sets of pixels in the reconstructed neighboring pixels 140 and 150. In some embodiments, the video coder compares the predictions of the different models to select the best model to generate the chroma predictor for the current block.

In some embodiments, a video encoder or decoder prepares multiple models of different types and/or for different regions for encoding or decoding a block of pixels (current block). The video coder classifies the pixels of the current block into the different types/regions and applies different CCLM models for those different types/regions. This is because the pixel histogram of an object and its background inside current block may be very different. Using only one LM model may result in inaccurate cross-component prediction.

In some embodiments, the neighboring pixels of the current block are divided into several groups. Each group is used to derive one linear model for CCLM prediction of the current block.

In some embodiments, the groups are categorized according to pixel magnitudes, e.g., pixels having luma values within a certain range are classified into a same group (magnitude group). In some embodiments, when the pixel value of an internal pixel of the current block belongs to a certain magnitude group, the linear model derived based on that magnitude group is used for CCLM model derivation. Deriving multiple CCLM models for different magnitude groups will be further described by reference to FIG. 6 below.

In some embodiments, the groups are categorized according to regions such that pixels in a same region are classified into a same group (region group). The current block may be a coding unit (CU) or a coding tree unit (CTU), and the regions may be split partitions of the current block by quadtree (QT) split, binary tree (BT) split, ternary tree (TT) split, or multi-type tree (MTT) split. The regions of the current block may also be virtual pipeline data units (VPDUs).

When applying a linear model to internal pixels of the current block, several methods can be used to determine which linear model to use. In some embodiments, when an internal pixel of the current block is near a particular neighboring region, the linear model derived from the pixels of the neighboring region is used to perform CCLM prediction.

Figure 2:
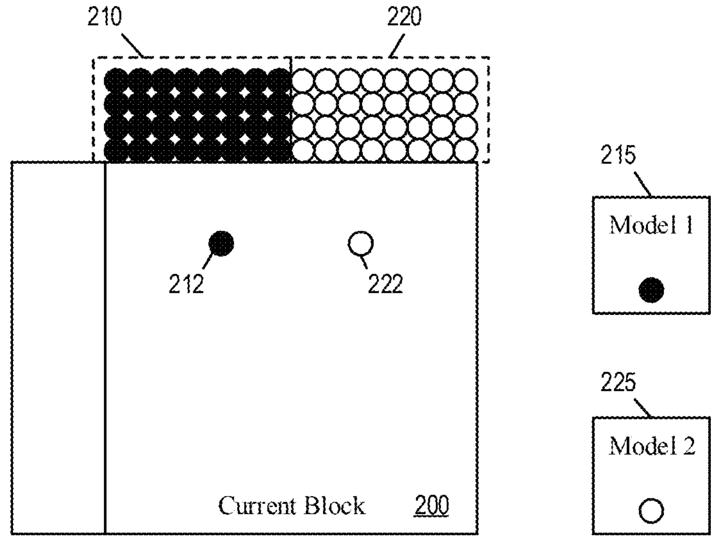
FIG. 2 illustrates using multiple models that are derived for different region groups.

FIG. 2 illustrates using multiple models that are derived for different region groups. In the example, there are two neighboring regions 210 and 220 above the top boundary of a current block 200. An Inside pixel 212 near the neighboring region 210 may use a first linear model 215 derived from the neighboring region 210, while an inside pixel 222 near the neighboring region 220 use a second linear model 225 derived from the neighboring region 220.

In some embodiments, the current block is divided into multiple regions (e.g., split into multiple rectangular regions). For each region of the current block, a corresponding L-shape neighbor is used to derive a linear model. Therefore, for each region of the current block, a different linear model for the CCLM can be derived and used. In some embodiments, if the region is not adjacent to a neighboring block (i.e., not adjacent to the boundary of the current block), vertically or horizontally corresponding neighboring pixels can be used to derive the CCLM linear model for the region of the current block.

In some embodiments, two linear models (top and left models) are used for CCLM. One linear model (top model) is derived based on neighboring reconstructed samples above the current block (e.g., CCLM_A or LM-T model), and the other linear model (left model) is derived based on neighboring reconstructed samples left of the current block (e.g., CCLM_L or LM-L model). In some embodiments, the mean of pixel values of the above neighboring reconstructed pixels and the mean of pixel values of the left neighboring reconstructed pixels are computed. If the pixel value of a sample is close to the computed mean of a particular side (e.g., top or left), then the model derived from that side is used to predict the sample. In some embodiments, if a sample is positionally close to the top neighbor, then the CCLM prediction of the sample uses the top model. If the sample is positionally close to the left neighbor, then the CCLM prediction of the sample uses the left model. In some embodiments, the CCLM prediction may use the top model to generate a first, top model predictor (pixelA) and the left model to generate a second, left model predictor (pixelB) and use some weighting factors to blend the two model predictors. For example, if the sample is positionally or magnitudally closer to the top neighbor than to the left neighbor, then the top model predictor is weighted more (greater weighting factor) than the left model predictor during blending.

In some embodiments, the neighboring pixels of the current block are partitioned into multiple regions, and multiple linear models for CCLM prediction are derived based on these different regions. In some embodiments, for each pixel sample inside the current block, another linear model is derived on-the-fly based on the distance(s) to the top boundary and/or the left boundary of the current block. The multiple different linear models are combined to form a linear combination CCLM model.

Figure 3:
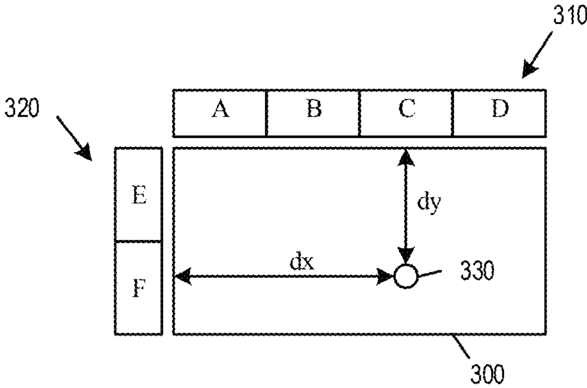
FIG. 3 conceptually illustrates derivation of a linear combination CCLM model.

FIG. 3 conceptually illustrates derivation of a linear combination CCLM model. As illustrated, a current block 300 has a left neighbor 310 at the left of the left boundary and a top neighbor 320 above the top boundary. The top neighbor 310 is partitioned into sections A, B, C, D and the left neighbor 320 is partitioned into section E and F. A pixel sample 330 has dx and dy as distances to the top and left neighbors 310 and 320. When performing CCLM prediction for the sample 330, the video coder may on-the-fly derive a CCLM model for the sample 330 based on the corresponding source linear model (e.g., derived based on pixels in sections C and F) and the distances (dx and dy) to the top and left neighbors. An example of such an on-the-fly CCLM model can be derived according to:

$$\alpha' = dy/(dx + dy) * \alpha c + dy/(dx + dy) * \alpha_F \quad \text{Eq. (9)}$$

$$\beta' = dy/(dx + dy) * \beta c + dy/(dx + dy) * \beta_F \quad \text{Eq. (10)}$$

α' and β' are the linear model parameters of the on-the-fly model. These two parameters are derived based on the (i) distances dx and dy, (ii) parameters $\alpha_C$ and $\beta_C$ of a linear model derived based on the top section C, and (iii) parameters $\alpha_F$ and $\beta_F$ of a linear model derived based on the left section F.

When the top and left neighbors 310 and 320 are not partitioned, the on-the-fly CCLM model can be derived according to $$\alpha' = dy/(dx+dy)*\alpha_L + dy/(dx+dy)*\alpha_T \quad \text{Eq. (11)}$$

$$\beta' = dy/(dx+dy)*\beta_L + dy/(dx+dy)*\beta_T \quad \text{Eq. (12)}$$

where $\alpha_T$ and $\beta_T$ are linear model parameters derived based on the top neighbor 310 (i.e., LM-T model), and $\alpha_L$ and $\beta_L$ are linear model parameters derived based on the left neighbor 320 (i.e., LM-L model). This is referred to as linear combination CCLM model. Another example linear combination CCLM model can be derived according to:

$$\alpha' = \left((W-dx)/W*\alpha_L + dx/W*\alpha_T\right)*A + \left((dy)/H*\alpha_L + (H-dx)/H*\alpha_T\right)*B \quad \text{Eq. (13)}$$

where A and B=0.5, or A=W/(W+H) and B=H/(W+H), or A=H/(W+H) and B=W/(W+H). Similar linear combination method can be used to combine the predictions of multiple LM-T and multiple LM-L models.

Figure 4:
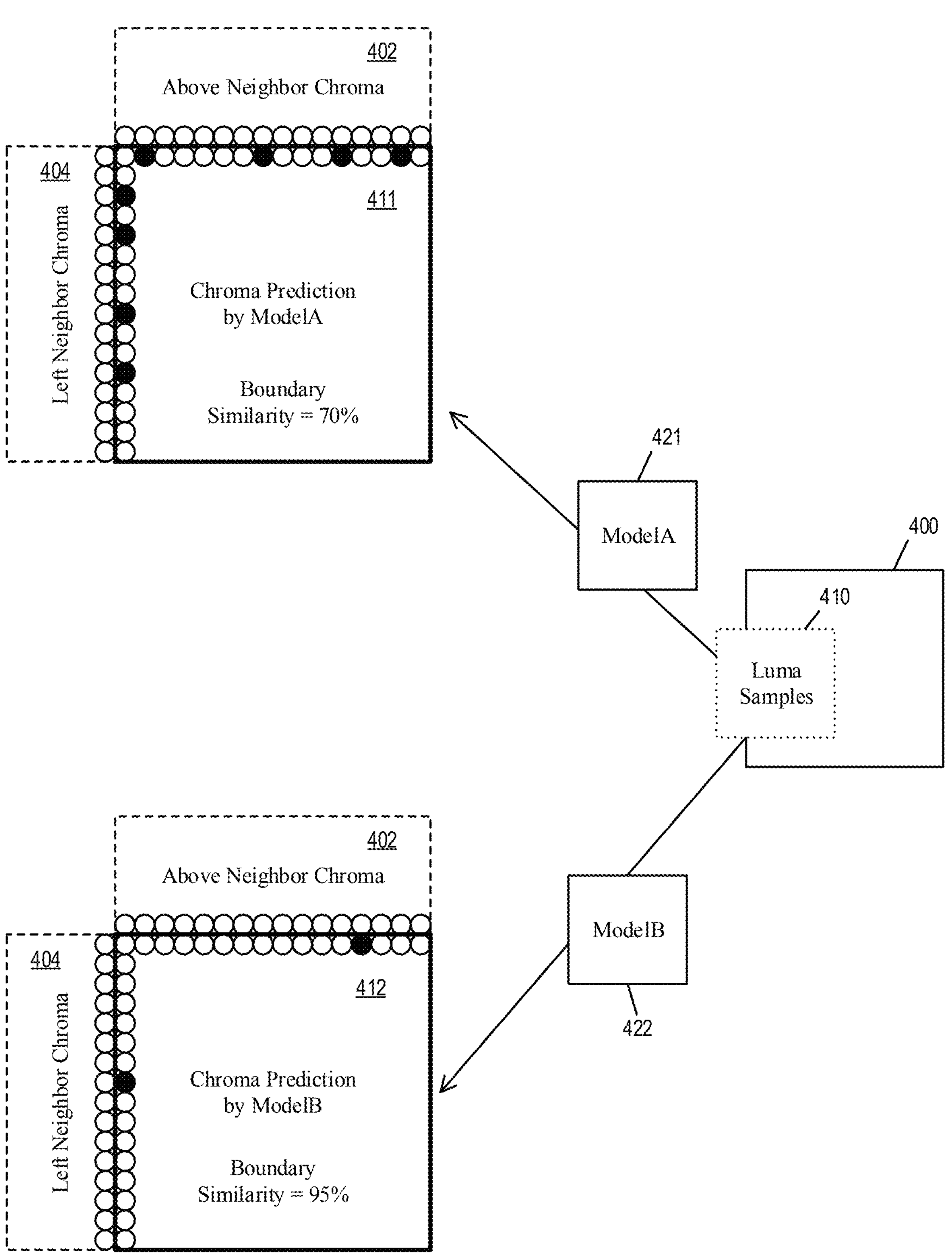
FIG. 4 illustrates selecting a best CCLM prediction model from multiple models based on similarity at the boundary.

In some embodiments, multiple models are used for CCLM, and a best model is selected according to the similarity of boundary samples at top and/or left boundaries of the current block. For example, the video coder may use two linear prediction models, modelA and modelB, to derive/predict two chroma predictors for the current block. For each chroma predictor, the video coder examines the smoothness or similarity at the boundary, for example, by comparing the chroma prediction samples along the boundary with neighboring pixels of the current block. The model that produces the better chroma prediction in terms of smoothness or similarity at the boundary is chosen to be the final CCLM model for the current block. FIG. 4 illustrates selecting a best CCLM prediction model from multiple models based on similarity at the boundary.

As illustrated, a first CCLM model (modelA) 421 is applied to luma samples 410 of a current block 400 to obtain a first chroma predictor 411. A second CCLM model (modelB) 422 also applied to luma samples 410 to obtain a second chroma predictor 412. The boundary samples of the modelA chroma predictor 411 are compared with (reconstructed) chroma samples in the above neighbor 402 and the left neighbor 404 to determine the boundary similarity for modelA. The boundary samples of the modelB chroma predictor 412 are compared with reconstructed samples in the above neighbor 402 and the left neighbor 404 to determine the boundary similarity for modelB. In this example, the boundary similarity for modelA is 70% and the boundary similarity for modelB is 95%. The video coder therefore selects modelB as the linear model for CCLM prediction for the current block 400.

In some embodiments, the boundary similarity is calculated based on a difference measure between prediction pixels (chroma predictor) in the current block and the reconstruction pixels neighboring the current block along the left and top boundaries of the current block (so a lower difference measure indicates higher similarity). An example of such a difference measure for boundary similarity is calculated according to the following:

$$diff = \sum_{x=0}^{block\ width}\left(\begin{array}{l}|a*pred_{x,0} - b*pred_{x,1} - c*reco_{x,-1}| + \\ |d*reco_{x,-1} - e*pred_{x,0} - f*reco_{x,-2}|\end{array}\right) + \sum_{y=0}^{block\ height}\left(\begin{array}{l}|g*pred_{0,y} - h*pred_{1,y} - i*reco_{-1,y}| + \\ |j*reco_{-1,y} - k*pred_{0,y} - l*reco_{-2,y}|\end{array}\right) \quad \text{Eq. (14)}$$

where $pred_x$ are prediction samples along the top boundary, $reco_x$ are reconstructed neighboring samples along the top boundary; where $pred_y$ are prediction samples along the left boundary, $reco_y$ are reconstructed neighboring samples along the left boundary. According to Eq. (14), two lines of predictor samples and two lines of reconstructed neighboring samples along the top and left boundaries are used to compute the difference measure (or similarity measure).

In some embodiments, the video coder may derive a different linear model for each chroma sample of the current block. In some embodiments, linear models from different neighboring samples are derived for different chroma samples. Each chroma sample may refer to some corresponding neighboring positions for building the linear model.

In some embodiments, the video coder may employ different linear models for different regions of the current block, i.e., the video coder may derive a different linear model for each region of the current block. In some embodiments, the video coder may derive two or more linear models for different partitions of the current block. Such partitions may be created by vertical binary tree splitting (VBT), horizontal binary tree splitting (HBT), ternary tree splitting (TT), or diagonal partition. For example, when the current block is partitioned by VBT into left and right regions, two linear models can be used for CCLM prediction: one linear model for the left partition and one linear model for right partition.

In some embodiments, the video coder may select neighboring samples in a row-based fashion (using different neighboring samples for each row), column-based fashion (using different neighboring samples for each column), or diagonal-based fashion (using different neighboring samples for each diagonal partition.)

Figure 5A:
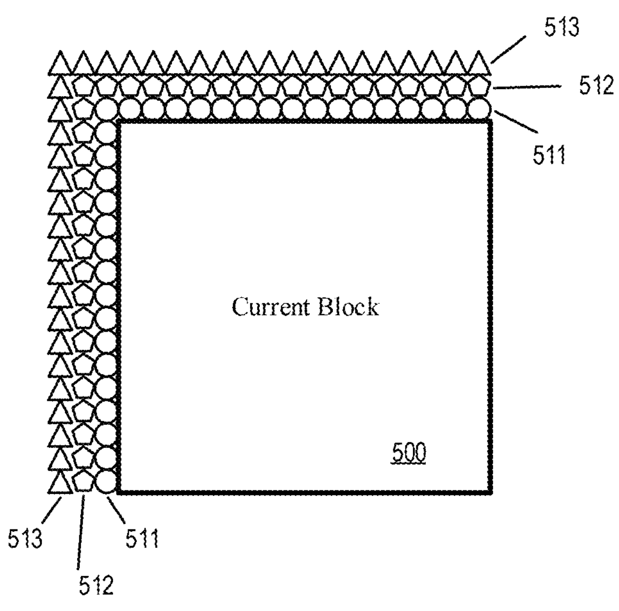
FIG. 5A-C illustrates using multiple lines of neighboring pixels for deriving linear models for CCLM prediction.
Figure 5B:
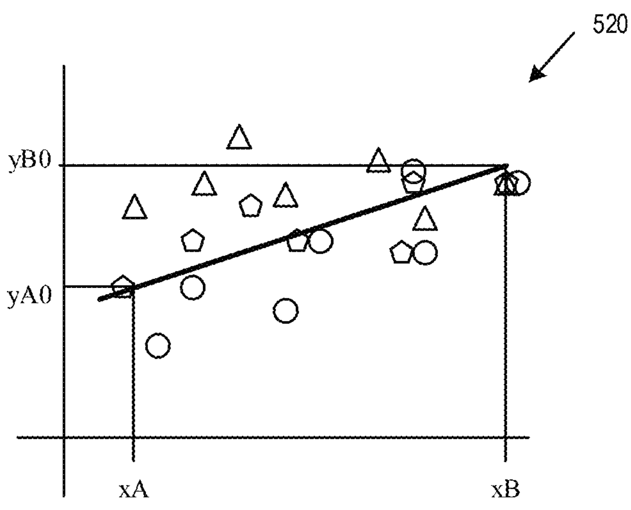
Figure 5C:
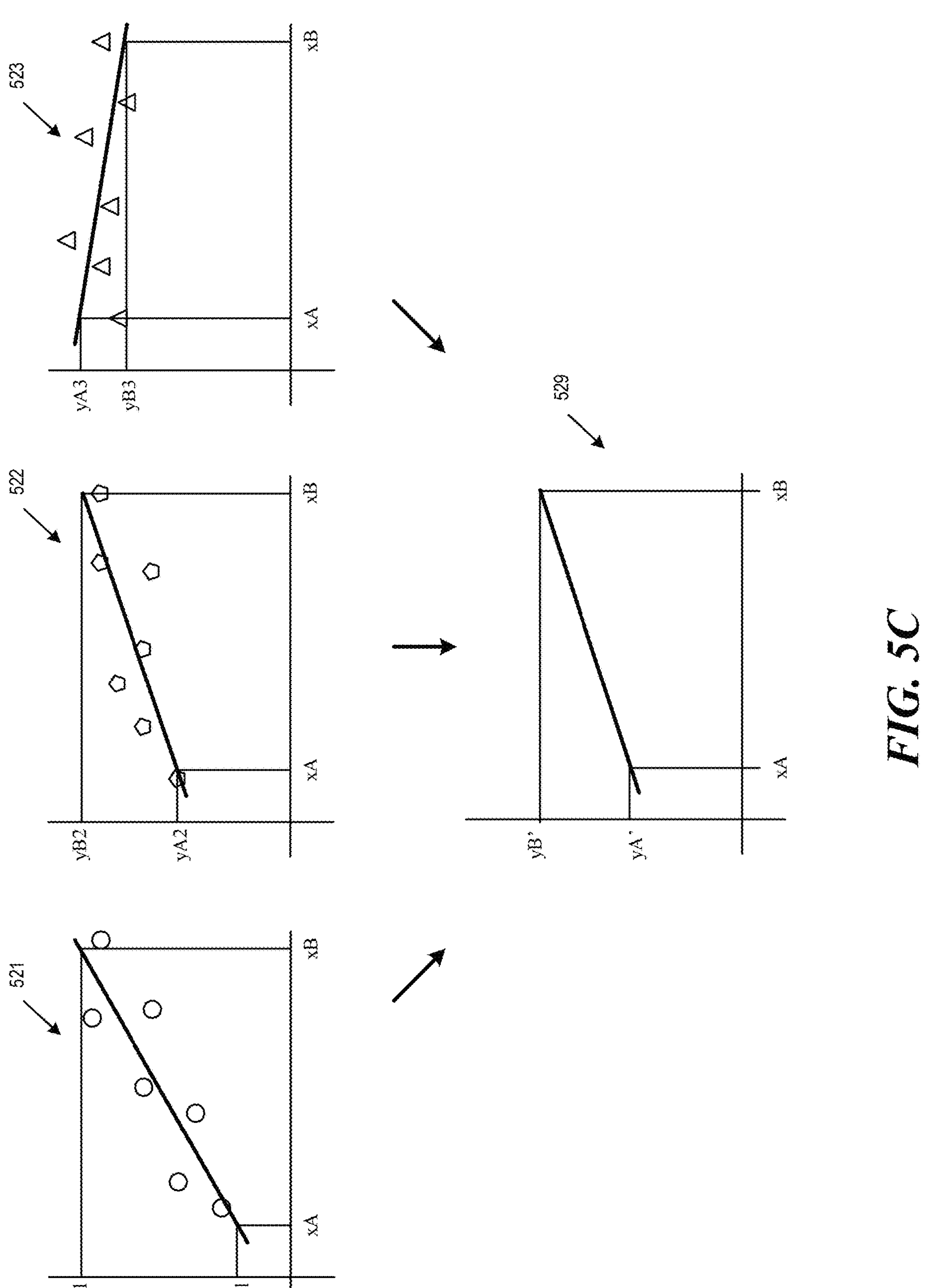

In some embodiments, to increase the coding gain of CCLM, multiple lines of neighboring pixels are used for CCLM derivation. FIG. 5A-C illustrates using multiple lines of neighboring pixels for deriving linear models for CCLM prediction. The figure illustrates a current block 500 having multiple lines of neighboring pixels that include at least lines 511, 512, and 513. These lines are used for CCLM model derivation.

In some embodiments, a CCLM model can be specified by a straight line that goes through points A and B with coordinates (xA, yA) and (xB, yB) respectively, where xA and xB are luma values, yA and yB are corresponding predicted chroma values luma values. (In some embodiments, yA and yB can be used as the parameters of a CCLM linear model instead of $\alpha$ and $\beta$.)

In some embodiments, when using multiple lines of neighboring pixels to derive a CCLM model, one yA and one yB are determined from the multiple lines of neighboring pixels. FIG. 5B illustrates defining the yA and yB of a CCLM model based on luma and chroma samples in all three lines 511-513 of neighboring pixels. In the example, a line (xA, yA0), (xB, yB0) defines a CCLM model 520.

In some embodiments, one linear model (one pair of one yA and one yB) is determined for each line. FIG. 5C illustrates deriving three linear models (three yAs and three yBs) 521-523 from the samples of the three neighboring lines 511-513, respectively. Specifically, the line (xA, yA1), (xB, yB1) is derived from line 511, the line (xA, yA2), (xB, yB2) is derived from line 512, and line (xA, yA3), (xB, yB3) is derived from line 513. In some embodiments, the average of the different yAs and yBs can be used as the yA and yB to derive one CCLM model. In the example of FIG. 5C, yA1, yA2, yA3, yB1, yB2, yB3 can be used to derive a CCLM model 529 that is defined by a line (xA, yA'), (xB, yB'), where yA' is the average of yA1, yA2, yA3, and yB' is the average of yB1, yB2, yB3.

In some embodiments, one CCLM model is derived based on one line that is selected from the multiple lines of neighboring pixels. The selection of the that one line from the multiple lines can be signaled in the coded video or bitstream for LM model derivation. In some embodiments, syntax elements are sent to identify one selected line or some selected lines of the top neighbor and/or left neighbor for the LM model derivation. The decoder can receive the syntax and choose a corresponding line for the LM model derivation. The syntax can include the line selection of the current block's neighboring pixels. The line selection of the luma and the chroma samples can be shared in one syntax signal set or separated into different syntax signal sets. For example, a syntax element may be used to signal that the neighboring line 512 is to be used for CCLM derivation. The video decoder may then use corresponding luma and chroma samples in the reconstructed neighboring line 512 to derive yA2 and yB2 for specifying the linear model for the current block 500.

As mentioned, in some embodiments, pixels are classified into different groups (magnitude groups) according to pixel magnitude, and the multiple different models used for CCLM prediction are derived for the different magnitude groups. Specifically, when the pixel value of an internal pixel of the current block belongs to a certain magnitude group, the linear model derived based on the neighboring pixels of that magnitude group is used for CCLM model derivation.

Figure 6:
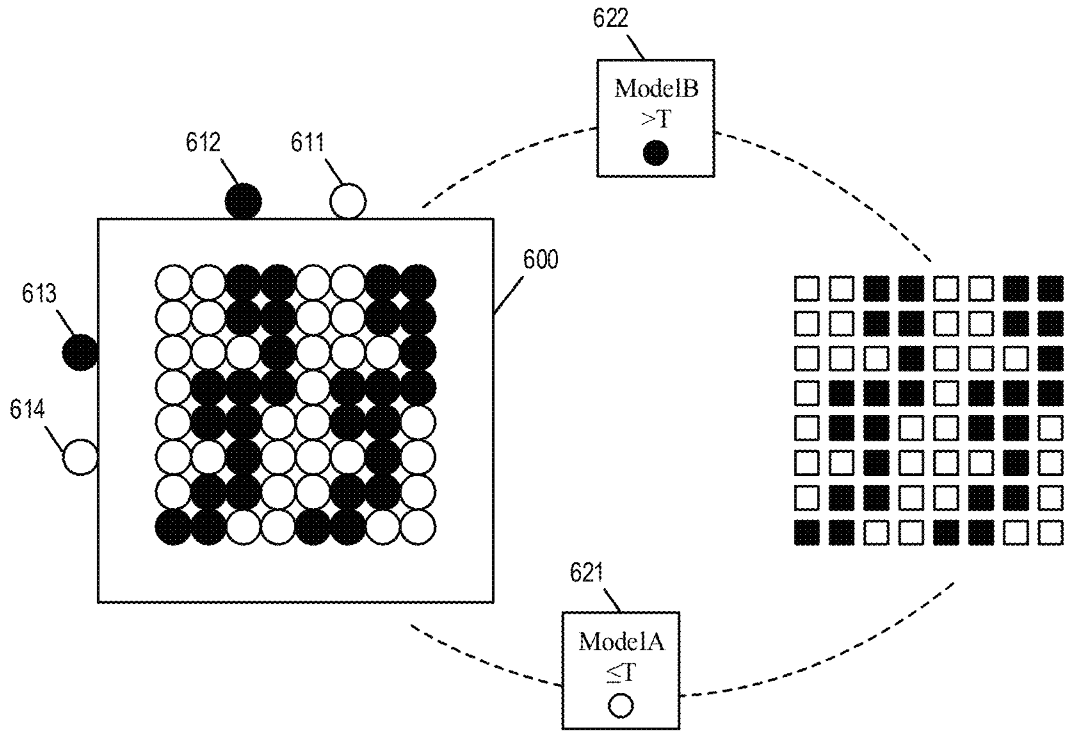
FIG. 6 conceptually illustrates classifying pixels for CCLM based on pixel magnitudes.

FIG. 6 conceptually illustrates classifying pixels for CCLM based on pixel magnitudes. The figure illustrates reconstructed neighboring pixels 611-614 that are used to construct the CCLM linear models of a current block 600. The pixels of the current block 600 are classified into two groups. Let Threshold be the mean of the four selected neighboring luma samples 611-614, the video coder may categorize the pixels of the current block 600 according to the Threshold. In this example, the inner samples of the current block 600 having luma magnitudes≤Threshold (the mean) are members of group A, and the other samples (with luma magnitudes>Threshold) are members of group B. These two groups may use two different linear models 621 (modelA) and 622 (modelB) for chroma prediction, which are denoted as parameter_set [0] and parameter_set [1] in some embodiments. Thus, for an inner luma sample value≤Threshold, the linear model 621 is applied for chroma prediction, else the linear model 622 is applied for chroma prediction. In general, some pre-defined or derived thresholds can be used to classify pixels into multiple different groups that apply different linear models.

In some embodiments, pixels are classified into multiple groups (for multi-model CCLM) by the edge and texture analysis. For example, Sobel edge detector can be applied to three neighboring lines of reconstructed, non-downsampled luma samples to classify the samples into two groups, specifically as either texture or edge. If the Sobel edge detector classifies a reconstructed neighbor luma sample as texture, then a first model (model 0) is applied for CCLM prediction. Otherwise (e.g., the sample is classified as edge), a second model (model 1) is applied. The thresholds for the edge/texture detection can be based on signaling in the coded video in e.g., picture parameter set, picture header, or slice header. In some embodiments, the threshold can be determined based on the current block's surrounding conditions (e.g., neighboring CU's edge detection result as either texture or edge, etc.)

III. CCLM with Multiple Luma Blocks

In some embodiments, multiple luma blocks are chosen for the LM derivation to improve coding gain of CCLM prediction. The $\alpha$ and $\beta$ parameters of the CCLM linear model are derived based on the chosen multiple luma blocks. In some embodiments, the pixel values of the multiple different luma blocks are averaged and used as the input values for the linear model derivation. In some embodiments, weighted averages can be used (e.g., if the block is near the collocated position, it will have higher weighting) as the input values for the derivation of the linear model ($\alpha$ and $\beta$ values).

Different embodiments select the multiple blocks differently. In some embodiments, some neighboring blocks of the collocated block are chosen. In some embodiments, the parent block (for splitting tree) is down-sampled to obtain the multiple blocks. In some embodiments, intra-block motion search method (similar to the Intra-Block Copy mode in VVC) is used to search some candidates inside the current picture to obtain the multiple blocks. Similar methods can be applied to select multiple luma blocks or multiple chroma blocks for the linear model derivation.

IV. Multi-Region LM Mode

In some embodiments, the video coder implements a multi-region LM mode. The mode partitions the current block into two or four partitions, each partition using its own corresponding top/left neighbors for deriving CCLM prediction model. In some embodiments, two or more linear models are derived for different partitions created by VBT, HBT, TT, or diagonal partitioning.

V. Hybrid LM Mode

In some embodiments, the video coder implements a hybrid LM mode. In the hybrid LM mode, one color component is coded by multi-model LM, while another color component is coded by single-model LM. For example, the Cb component may be coded by using multi-model LM (multi models based on different spatial region, or multi-models based on different pixel classification), while the Cr component by coded by using single model LM.

VL. Segmentation Based LM Mode

Some embodiments of the disclosure provide a segmentation-based LM mode. In this mode, the neighboring L-shape pixels are segmented and categorized into two or more regions. According to the segmentation information, the internal pixels inside the current block are partitioned or classified into two or more regions. Each region uses corresponding L-shaped neighboring pixels to derive the LM model.

Figure 7:
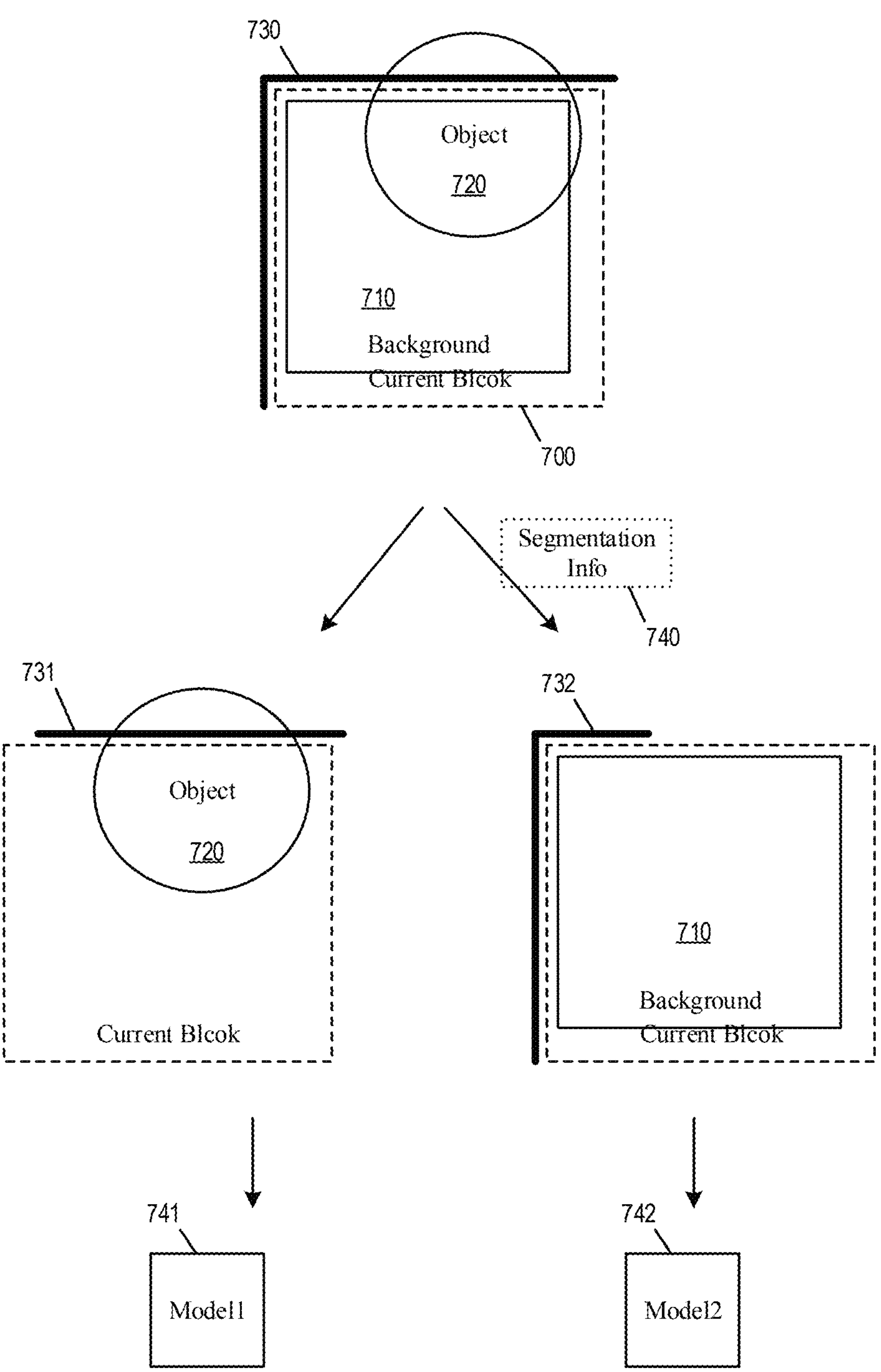
FIG. 7 conceptually illustrates segmentation-based LM mode.

FIG. 7 conceptually illustrates the segmentation-based LM mode. As illustrated, a current block 700 includes pixels that depict (part of) a background 710 and (part of) a foreground object 720. L-shaped neighboring pixels 730 of the current block 700 are to be used to derive multiple LM models for CCLM prediction. A segmentation information 740 is provided, according to which two segments 731 and 732 of the L-shaped neighboring pixels 730 are specified.

Specifically, the segment 731 is used to generate a first LM model 741 that is used to perform chroma prediction for the object 720. The segment 732 is used to generate a second LM model 742 that is used to perform chroma prediction for the background 710.

VII. Pixel Refinement after CCLM Prediction

In some embodiments, pixel refinement is performed after the LM process is performed to generate the chroma pixels predictor. The above-side neighboring pixels of the current block is used to refine or adjust the pixels of the current block near top boundary. The left-side neighboring pixels of the current block is used to refine or adjust the pixels of the current block near the left boundary.

The refinement causes the pixels values near the boundary of the current block to be closer to that of the neighboring pixels. For example, the refinement can be done by filtering the internal pixels near the top side of the current block with the neighboring pixels above the current block. Weighted average procedure can also be used. For example, for the internal pixel line of the current block nearest the top side, the upper neighboring pixels would have the largest weighting factor. For the internal pixel line far away from the top side, the above neighboring pixels would have lower weighting factor. Likewise, for the internal pixel line of the current block nearest the left side, the left neighboring pixels would have the largest weighting factor. For the internal pixel line far away from the left side, the upper neighboring pixels would have lower weighting factor.

In some embodiments, the video coder may pre-process luma reconstructed samples before applying the CCLM linear model. In some embodiments, the video coder post-process chroma predictor samples after applying the CCLM linear model. The pre-processing and/or post-processing may include the following: 3×3 or 5×5 filtering, biasing, clipping, adaptive loop filtering (ALF), sample adaptive offset (SAO), signal filter set, etc. To apply chroma filtering after applying a LM model to a first color component (e.g., Cb), the video coder may select a linear model for the second color component (e.g., Cr) based on the processing of the first color component. For example, when CCLM prediction is used to predict and reconstruct the Cb component (with residuals added), the video coder may try different filter methods (on decoder side) on the reconstructed Cb samples and see which filter method is the best (e.g., the best for boundary smoothness). Then, the same filter selection can be applied for the Cr component.

VIII. Occlusion Resolving by Partial-LM+Partial-Inter Mode

Object occlusion is an issue in image or video processing that often occurs when two or more objects are positioned too closely such that the different objects seemingly merge or combine with each other. In some cases, object occlusion may cause the video encoder to encode a block as partial-inter and partial intra.

Figure 8:
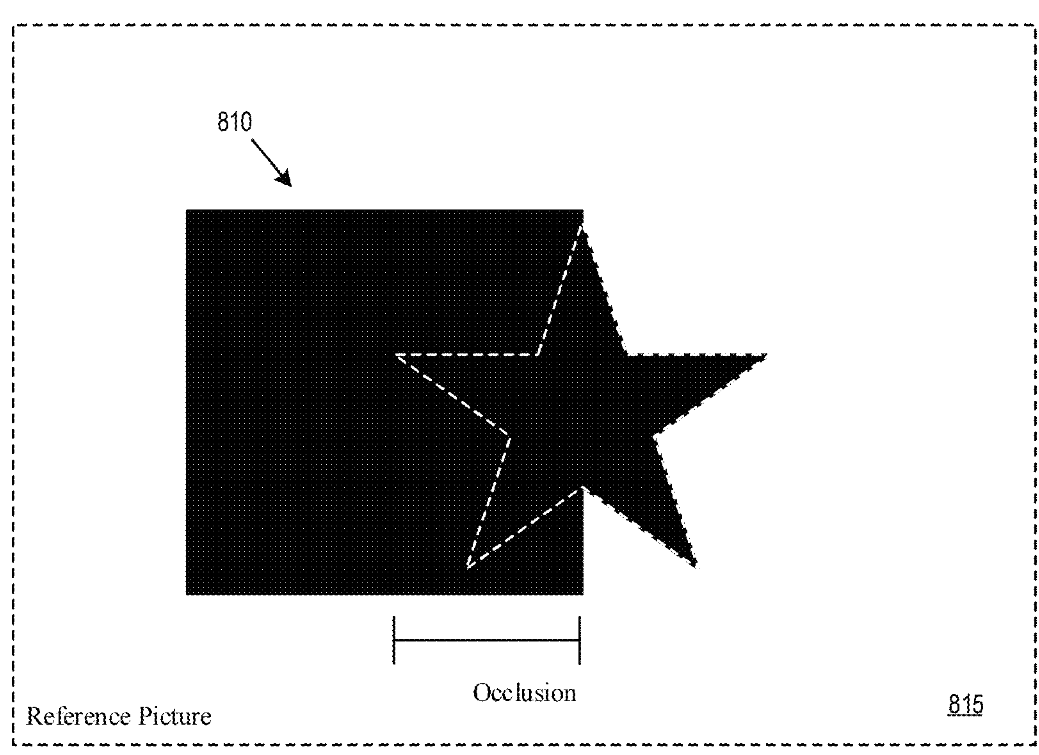
FIG. 8 conceptually illustrates a block of pixels that is coded as partial inter and partial intra due to occlusion.
Figure 8:
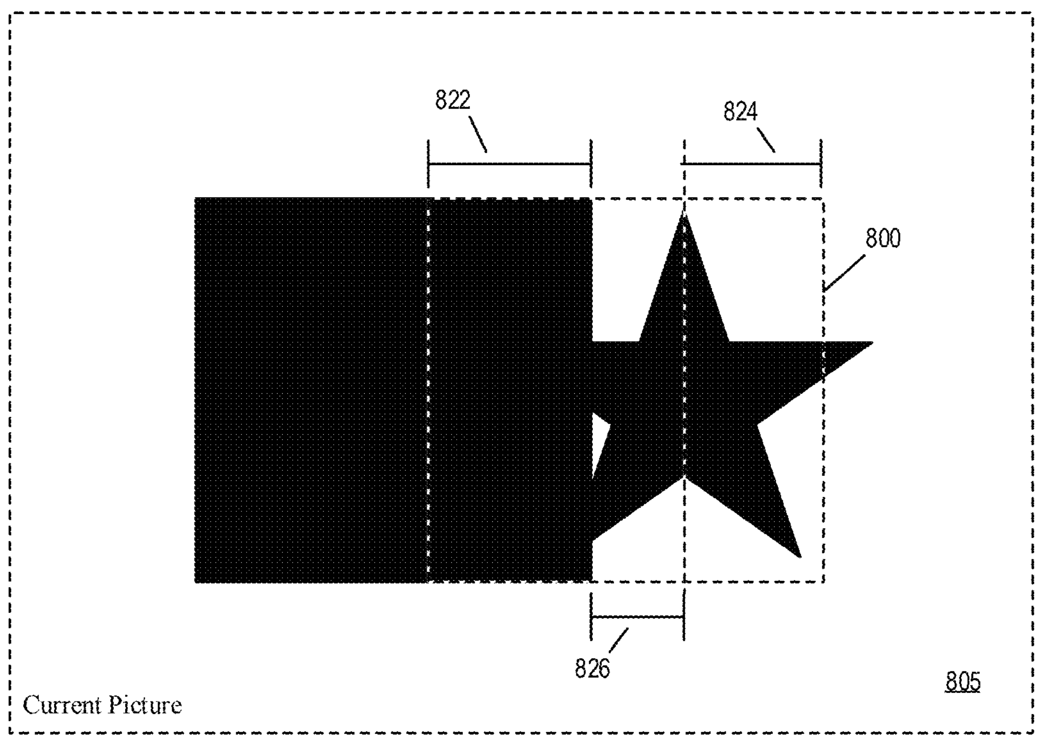

FIG. 8 conceptually illustrates a block of pixels that is coded as partial inter and partial intra due to occlusion. The figure illustrates a current block 800 being coded in a current picture 805 and a set of reference pixels 810 in a reference picture 815. The current block 820 has left and right regions 822 and 824. The left region 822 is coded by intra coding. The right region 824 is coded by inter coding. A sub-region 826 has corresponding reference pixels that are occluded in the reference picture 815. Though the sub-region 826 is part of a moving object, the encoder may code the occluded sub-region 826 using LM-based chroma intra-prediction coding.

In some embodiments, if the encoder does not signal to the decoder which region is occluded, the decoder may implicitly determine which regions are coded by inter mode, which regions are coded by intra mode, and which regions are coded by LM mode. In some embodiments, the luma component of the current block 800 is coded entirely using inter mode. The encoder/decoder may use the magnitude of luma residual (IDCT result) to decide whether to code the chroma component of a particular region using inter, intra, and/or LM mode. If the corresponding luma component of the region has higher magnitude in the residual, the encoder/decoder uses LM-based chroma intra-prediction coding to derive the chroma component of the region. If the corresponding luma component of the region has lower magnitude in residual, the encoder/decoder uses inter-prediction based chroma prediction method to derive the chroma component of the region.

In some embodiments, the determination of whether to use LM, intra prediction, or inter prediction for the chroma component of a region is based on the sub-block transform (SBT) signal of the luma component. For example, if SBT signal of the luma component indicates to the decoder that only the left half of current block has residual, then the right half of the current block will not have residual values. For chroma prediction, the left half (has residual) will be intra-coded (using LM) and the right half will be inter-coded (little or no residual).

IX. Example Video Encoder

Figure 9:
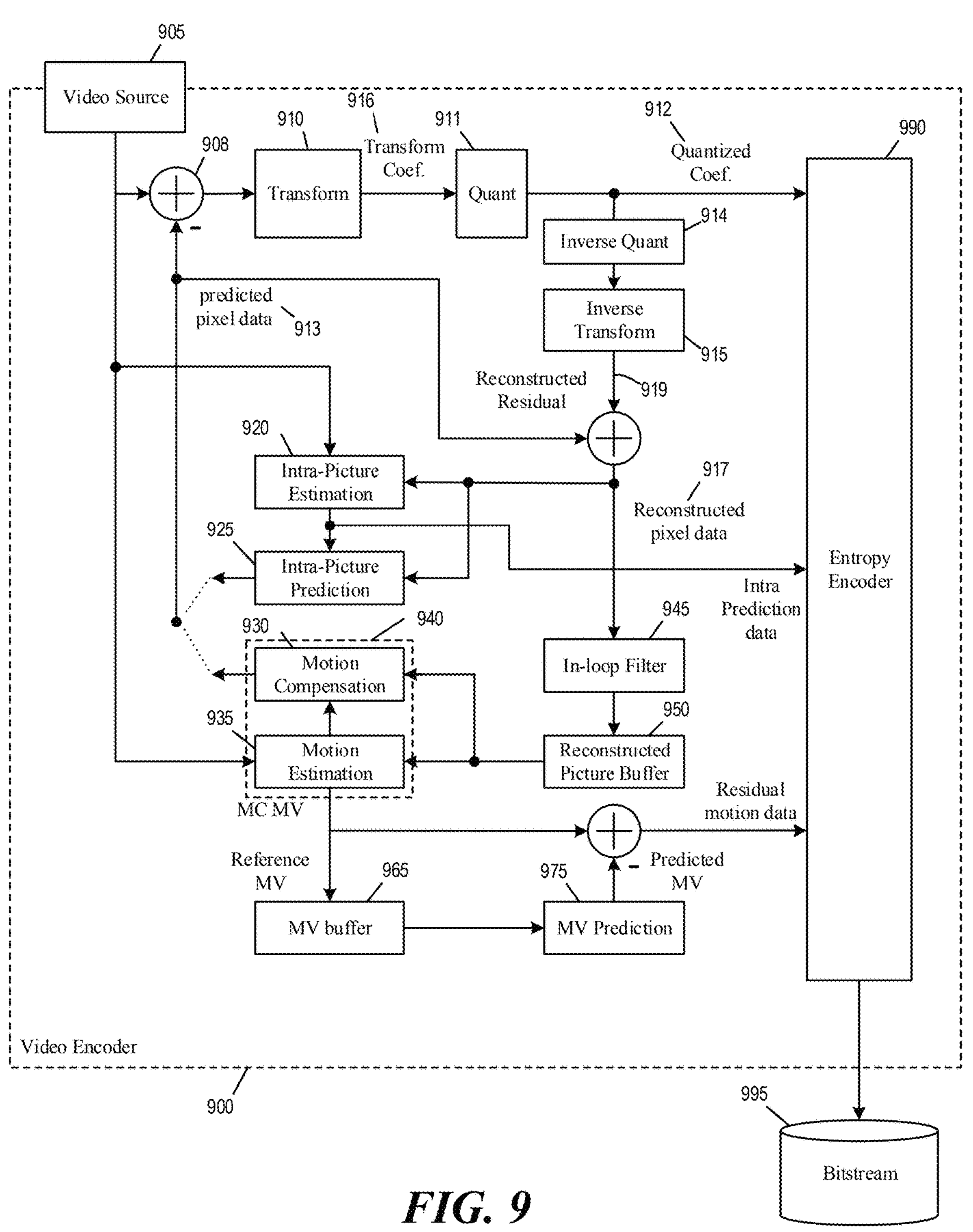
FIG. 9 illustrates an example video encoder that may implement multi-model chroma prediction.

FIG. 9 illustrates an example video encoder 900 that may implement multi-model chroma prediction. As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a MV buffer 965, and a MV prediction module 975, and an entropy encoder 990. The motion compensation module 930 and the motion estimation module 935 are part of an inter-prediction module 940.

In some embodiments, the modules 910-990 are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each video frame without compression. A subtractor 908 computes the difference between the raw video pixel data of the video source 905 and the predicted pixel data 913 from the motion compensation module 930 or intra-prediction module 925. The transform module 910 converts the difference (or the residual pixel data or residual signal 908) into transform coefficients (e.g., by performing Discrete Cosine Transform, or DCT). The quantization module 911 quantizes the transform coefficients into quantized data (or quantized coefficients) 912, which is encoded into the bitstream 995 by the entropy encoder 990.

The inverse quantization module 914 de-quantizes the quantized data (or quantized coefficients) 912 to obtain transform coefficients, and the inverse transform module 915 performs inverse transform on the transform coefficients to produce reconstructed residual 919. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
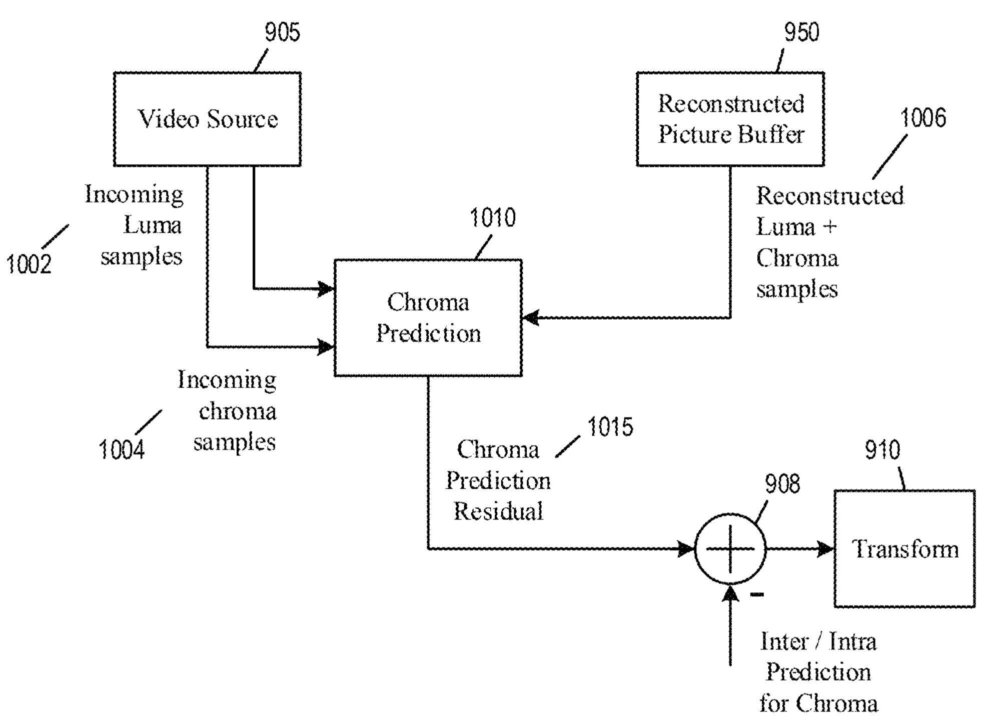
FIG. 10 illustrates portions of the video encoder that implement multi-model chroma prediction.
Figure 10:
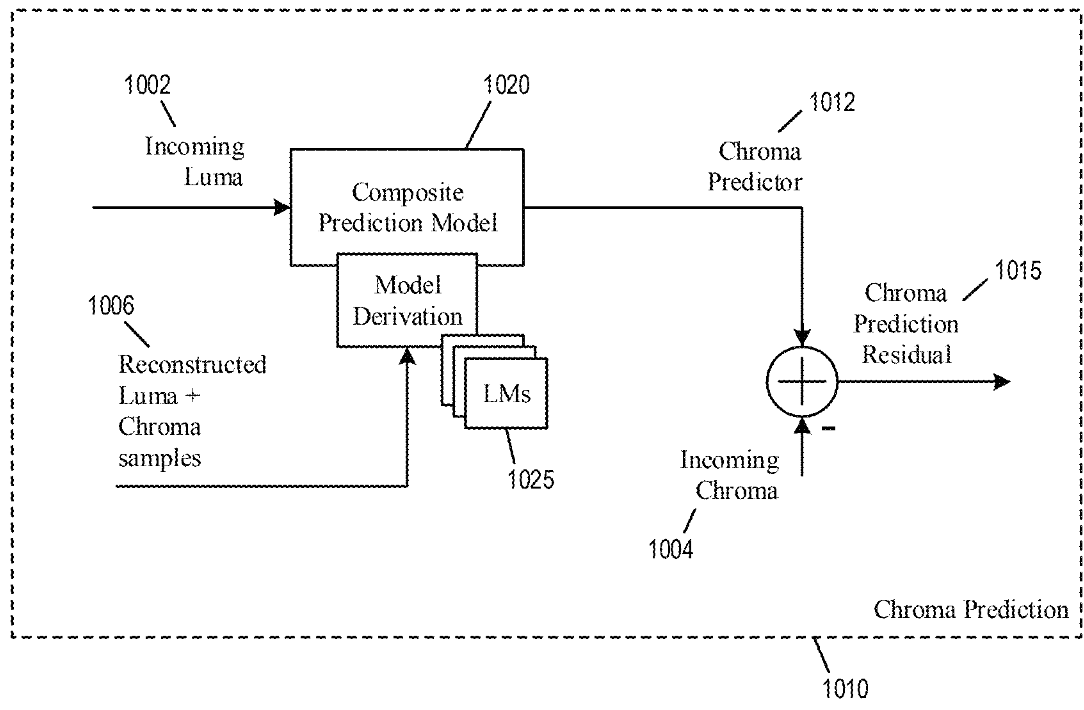

FIG. 10 illustrates portions of the video encoder 900 that implement multi-model chroma prediction. As illustrated, the video source 905 provides incoming luma and chroma samples 1002 and 1004, while the reconstructed picture buffer 950 provides reconstructed luma and chroma samples 1006.

A chroma prediction module 1010 is applied to the incoming luma samples 1002 to generate a chroma predictor 1012. The chroma predictor 1012 is then used to produce the chroma prediction residual 1015 by subtracting the incoming chroma samples 1004. The chroma prediction residual signal 1015 is encoded (transformed, inter/intra predicted, etc.) in place of regular chroma samples.

The composite prediction model 1020 is derived from multiple different prediction linear models 1025. In some embodiments, the parameters (e.g., $\alpha$ and $\beta$, or yA and yB) of the composite linear model 1020 are derived from the parameters of the plurality of prediction linear models 1025. In some embodiments, one of the prediction linear models 1025 having a best boundary similarity measure is selected, and the parameters of the selected prediction linear model are used as that of the composite prediction model. In some embodiments, the parameters of the multiple different prediction linear models 1025 are averaged to become the parameters of the composite linear model 1020.

The multiple prediction linear models 1025 are derived based on the reconstructed luma and chroma samples 1006 retrieved from the reconstructed picture buffer 950. The multiple different prediction linear models 1025 may be derived from different types or regions or segments of the reconstructed luma and chroma samples 1006 as described above in Sections II-VII. For example, in some embodiments, the multiple different prediction linear models 1025 may be derived from different lines of the neighboring pixels. In some embodiments, the multiple different prediction linear models 1025 may be derived from different segments of the neighboring pixels at the left and top boundaries of the current block. In some embodiments, one of the prediction linear models 1025 may be derived from multiple different luma blocks.

Figure 11:
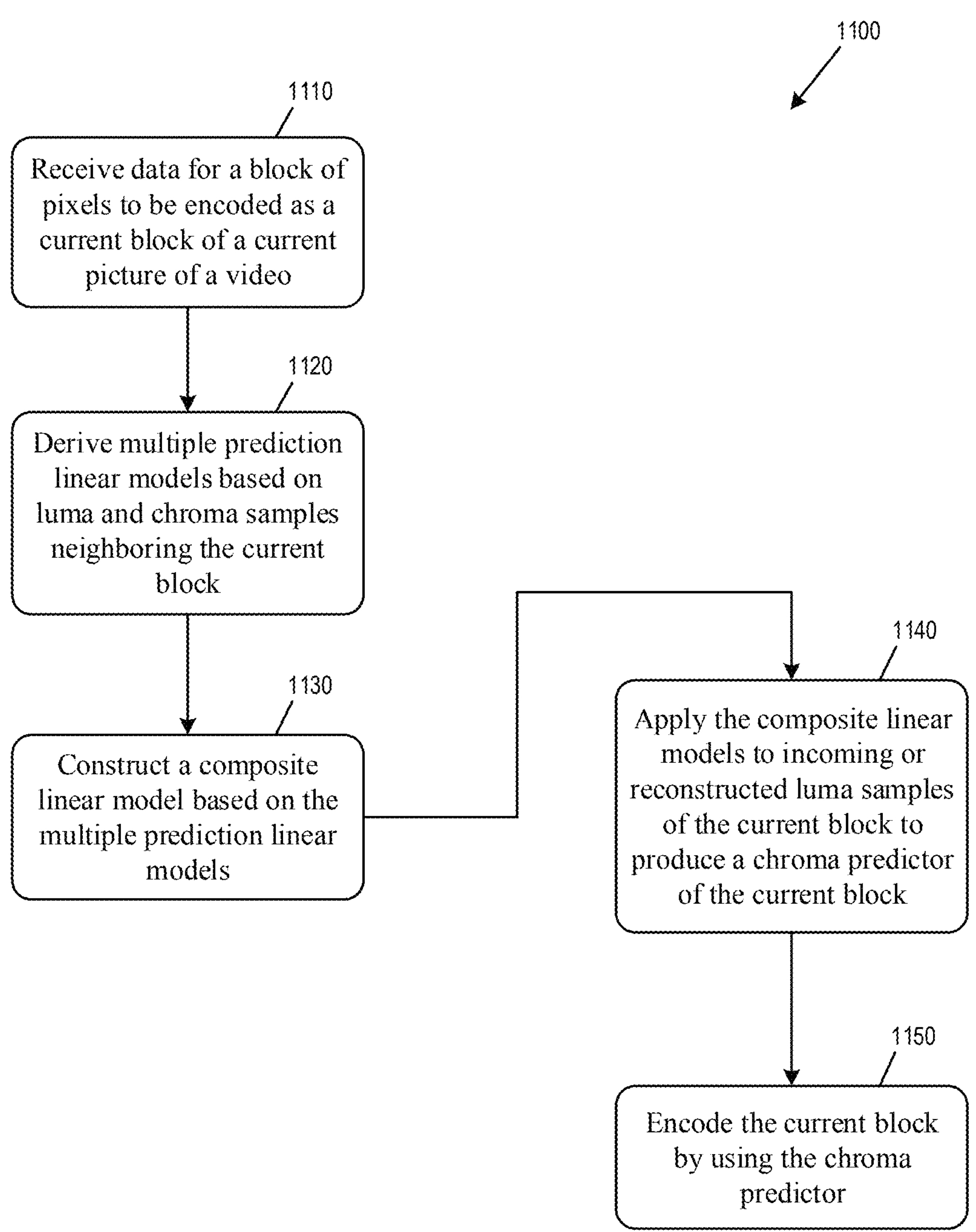
FIG. 11 conceptually illustrates a process for using multi-model chroma prediction to encode a block of pixels.

FIG. 11 conceptually illustrates a process 1100 for using multi-model chroma prediction to encode a block of pixels. In some embodiments, one or more processing units (e.g., a processor) of a computing device implementing the encoder 900 performs the process 1100 by executing instructions stored in a computer readable medium. In some embodiments, an electronic apparatus implementing the encoder 900 performs the process 1100.

The encoder receives (at block 1110) data for a block of pixels to be encoded as a current block in a current picture of a video.

The encoder derives (at block 1120) multiple prediction linear models based on luma and chroma samples neighboring the current block. In some embodiments, pixels are classified into different groups according to pixel magnitudes, and the multiple prediction linear models are correspondingly derived for the different magnitude groups. In some embodiments, neighboring pixels of the current block are partitioned into multiple segments according to a set of segmentation information, and the multiple prediction linear models include linear models that are derived based on the multiple segments. The encoder may pre-process the luma and chroma samples before deriving the multiple prediction linear models.

In some embodiments, the multiple prediction linear models include a linear model that is derived based on distances to top or left boundaries of the current block. In some embodiments, in a hybrid mode, the multiple prediction linear models are constructed for a first chroma component of the current block (e.g., Cb), wherein only one prediction linear model is constructed for a second chroma component (e.g., Cr) of the current block. In some embodiments, the parameters of the multiple prediction linear models are derived based on multiple different luma blocks.

The encoder constructs (at block 1130) a composite linear model based on the multiple prediction linear models. In some embodiments, the encoder may select a prediction linear model from the multiple prediction linear models and use the parameters of the selected prediction linear model as the parameters of the composite linear model. In some embodiments, the selected prediction linear model has a best boundary similarity among the multiple prediction linear models. The boundary similarity of a prediction linear model may be computed by comparing (i) reconstructed chroma samples neighboring the current block and (ii) boundary samples of a chroma predictor produced by the prediction linear model base on the luma samples of the current block.

In some embodiments, multiple lines of neighboring pixels of the current block are used to provide samples for deriving the parameters of the composite linear model. In some embodiments, at least one prediction linear model of the plurality of prediction linear models is derived using one or more lines of the multiple lines of neighboring pixels. In some embodiments, each line of the multiple lines of neighboring pixels is used to derive one prediction linear model of the plurality of prediction linear models. The parameters of the composite linear model may be derived by averaging the parameters of the multiple prediction linear models. The encoder may signal the selection of one of the multiple lines, and the prediction linear model derived from the selected line of neighboring pixels is used as the composite linear model.

The encoder applies (at block 1140) the composite linear model to incoming or reconstructed luma samples of the current block to generate a chroma predictor of the current block. The encoder uses (at block 1150) the chroma predictor to encode the current block. Specifically, the predicted chroma samples are used to produce the chroma prediction residual by subtracting the incoming actual chroma samples. The chroma prediction residual signal is encoded (transformed, inter/intra predicted, etc.) into bitstream. In some embodiments, the encoder may post-process the chroma predictor before using the chroma predictor to reconstruct chroma samples of the current block or to encode the current block. In some embodiments, a first region of the current block is encoded by using the chroma predictor and a second region of the current block is encoded by using inter-prediction. In some embodiments, the encoder identifies the first and second regions based on luma residual samples of the current block.

X. Example Video Decoder

In some embodiments, an encoder may signal (or generate) one or more syntax element in a bitstream, such that a decoder may parse said one or more syntax element from the bitstream.

Figure 12:
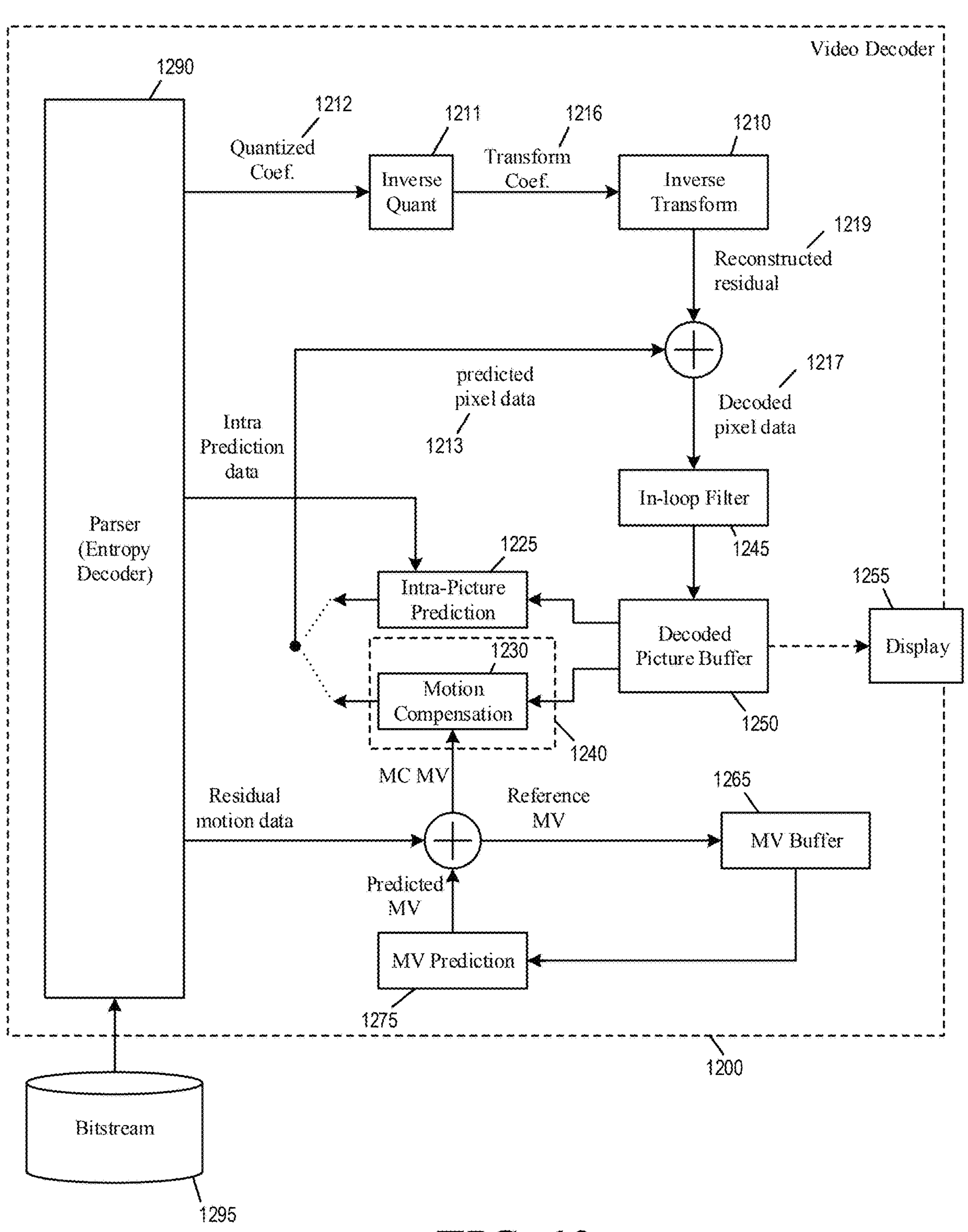
FIG. 12 illustrates an example video decoder that may implement multi-model chroma prediction.

FIG. 12 illustrates an example video decoder 1200 that may implement multi-model chroma prediction. As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219. The reconstructed residual signal 1219 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
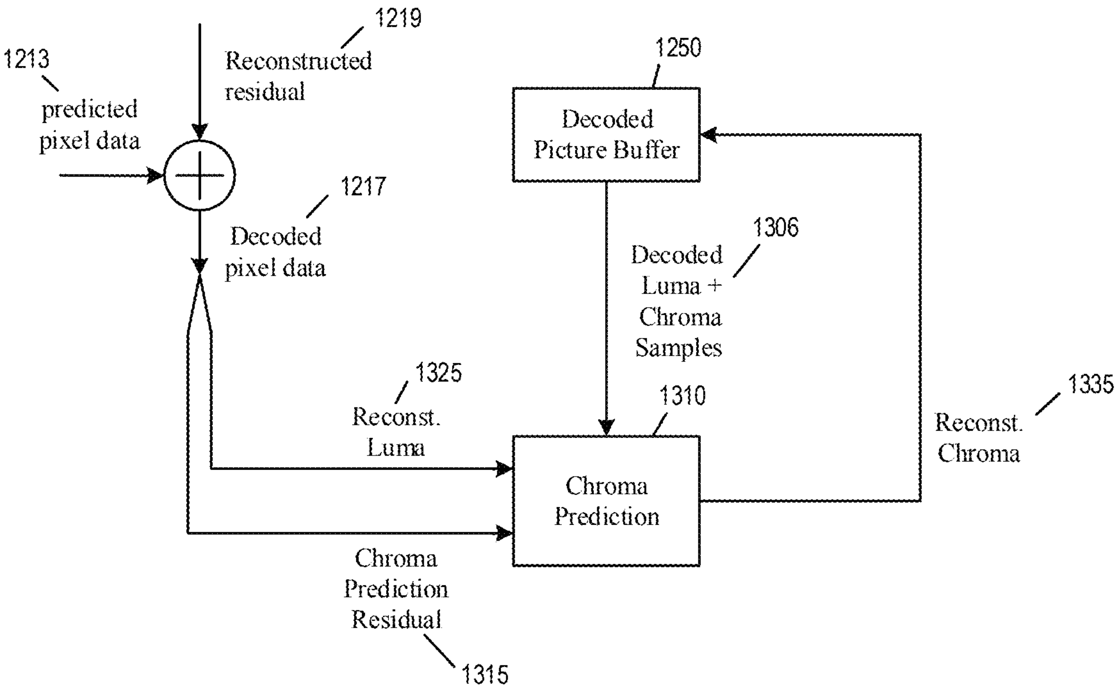
FIG. 13 illustrates portions of the video decoder that implement multi-model chroma prediction.
Figure 13:
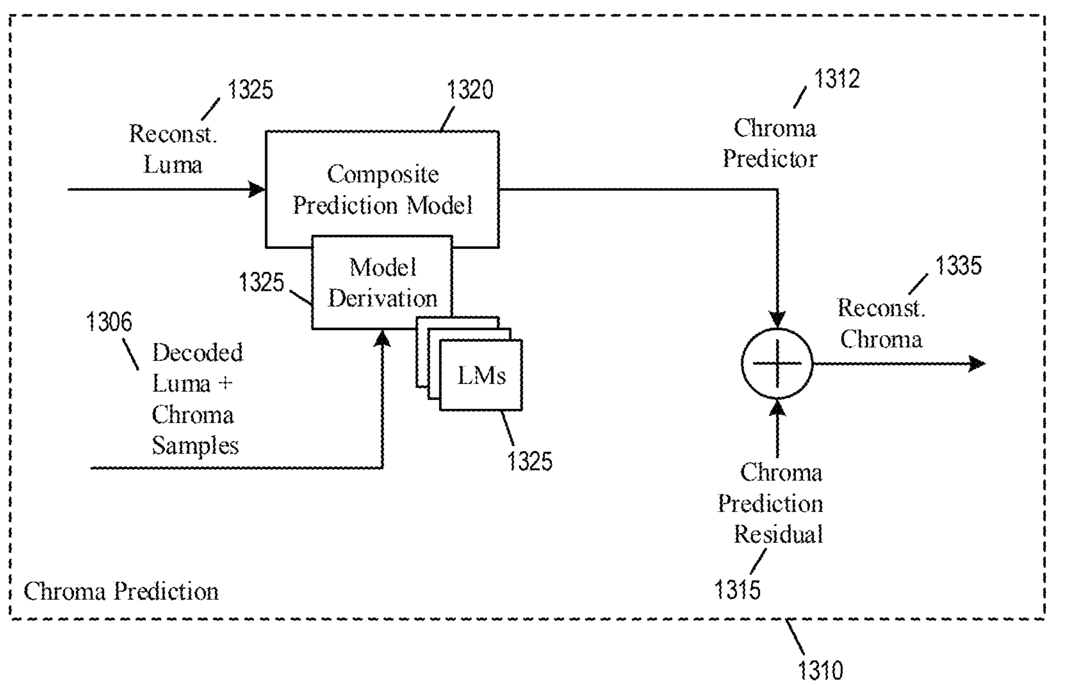

FIG. 13 illustrates portions of the video decoder 1200 that implement multi-model chroma prediction. As illustrated, the decoded picture buffer 1250 provides decoded luma and chroma samples to a chroma prediction module 1310, which produces reconstructed chroma samples 1335 for display or output by predicting chroma samples based on luma samples.

The chroma prediction module 1310 receives the decoded pixel data 1217, which includes reconstructed luma samples 1325 and chroma prediction residual 1315. The chroma prediction module 1310 uses the reconstructed luma samples 1325 to produce a chroma predictor 1312. The chroma predictor 1312 is then added with the chroma prediction residual 1315 to produce the reconstructed chroma samples 1335. The reconstructed chroma samples 1335 are then stored in the decoded picture buffer 1250 for display and for reference by subsequent blocks and pictures.

The composite prediction model 1320 is derived from multiple different prediction linear models 1325. In some embodiments, the parameters (e.g., $\alpha$ and $\beta$, or yA and yB) of the composite linear model 1320 are derived from the parameters of the plurality of prediction linear models 1325. In some embodiments, one of the prediction linear models 1325 having a best boundary similarity measure is selected, and the parameters of the selected prediction linear model are used as that of the composite prediction model. In some embodiments, the parameters of the multiple different prediction linear models 1325 are averaged to become the parameters of the composite linear model 1320.

The multiple prediction linear models 1325 are derived based on the decoded luma and chroma samples 1306 retrieved from the decoded picture buffer 1250. The multiple different prediction linear models 1325 may be derived from different types or regions or segments of the decoded luma and chroma samples 1306 as described above in Sections II-VIII. For example, in some embodiments, the multiple different prediction linear models 1325 may be derived from different lines of the neighboring pixels. In some embodiments, the multiple different prediction linear models 1325 may be derived from different segments of the neighboring pixels at the left and top boundaries of the current block. In some embodiments, one of the prediction linear models 1325 may be derived from multiple different luma blocks.

Figure 14:
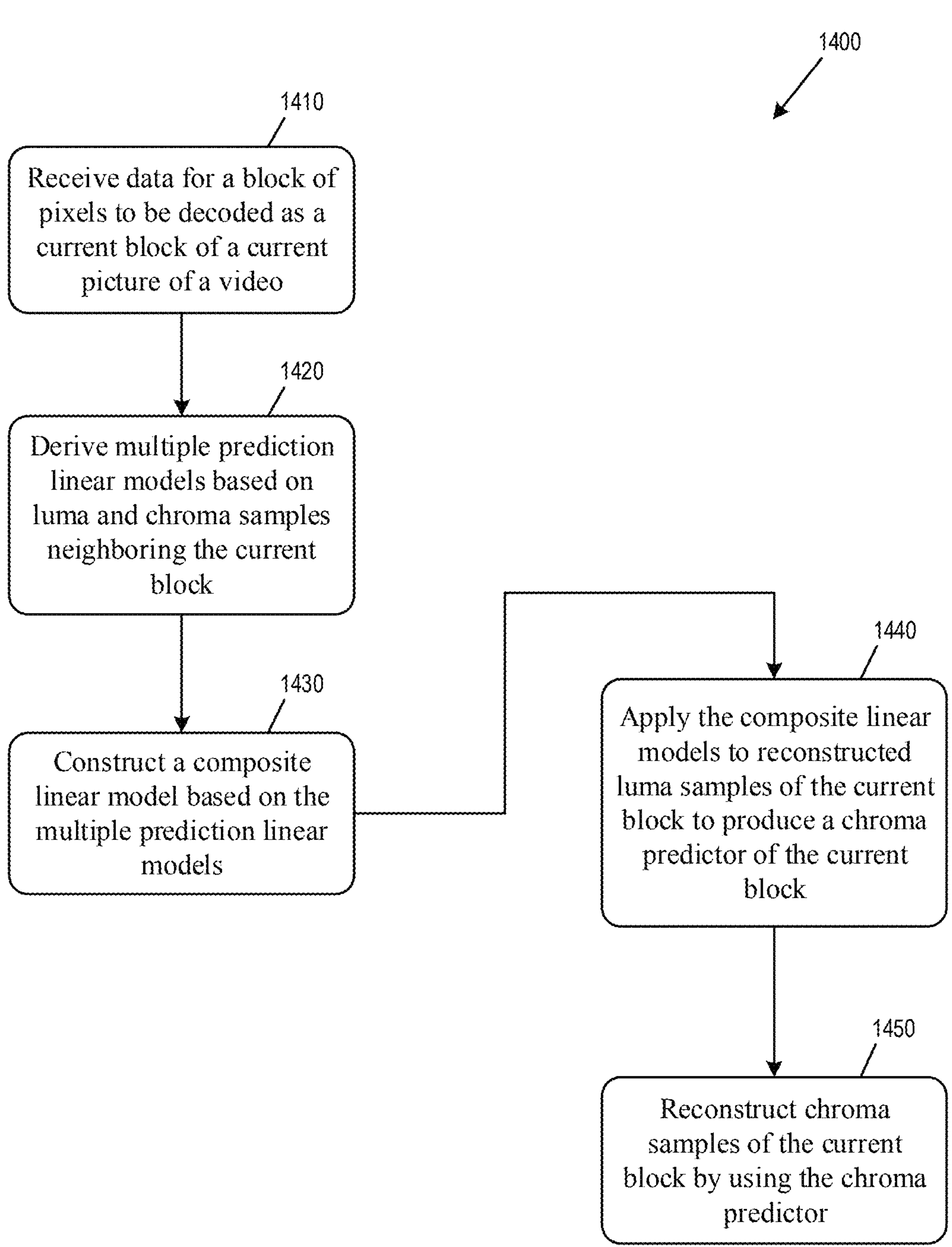
FIG. 14 conceptually illustrates a process for using multi-model chroma prediction to decode a block of pixels.

FIG. 14 conceptually illustrates a process 1400 for using multi-model chroma prediction to decode a block of pixels. In some embodiments, one or more processing units (e.g., a processor) of a computing device implementing the decoder 900 performs the process 1400 by executing instructions stored in a computer readable medium. In some embodiments, an electronic apparatus implementing the decoder 900 performs the process 1400.

The decoder receives (at block 1410) data for a block of pixels to be decoded as a current block in a current picture of a video.

The decoder derives (at block 1420) multiple prediction linear models based on luma and chroma samples neighboring the current block. In some embodiments, pixels are classified into different groups according to pixel magnitudes, and the multiple prediction linear models are correspondingly derived for the different magnitude groups. In some embodiments, neighboring pixels of the current block are partitioned into multiple segments according to a set of segmentation information, and the multiple prediction linear models include linear models that are derived based on the multiple segments. The decoder may pre-process the luma and chroma samples before deriving the multiple prediction linear models.

In some embodiments, the multiple prediction linear models include a linear model that is derived based on distances to top or left boundaries of the current block. In some embodiments, in a hybrid mode, the multiple prediction linear models are constructed for a first chroma component of the current block (e.g., Cb), wherein only one prediction linear model is constructed for a second chroma component (e.g., Cr) of the current block. In some embodiments, the parameters of the multiple prediction linear models are derived based on multiple different luma blocks.

The decoder constructs (at block 1430) a composite linear model based on the multiple prediction linear models. In some embodiments, the decoder may select a prediction linear model from the multiple prediction linear models and use the parameters of the selected prediction linear model as the parameters of the composite linear model. In some embodiments, the selected prediction linear model has a best boundary similarity among the multiple prediction linear models. The boundary similarity of a prediction linear model may be computed by comparing (i) reconstructed chroma samples neighboring the current block and (ii) boundary samples of a chroma predictor produced by the prediction linear model base on the luma samples of the current block.

In some embodiments, multiple lines of neighboring pixels of the current block are used to provide samples for deriving the parameters of the composite linear model. In some embodiments, at least one prediction linear model of the plurality of prediction linear models is derived using one or more lines of the multiple lines of neighboring pixels. In some embodiments, each line of the multiple lines of neighboring pixels is used to derive one prediction linear model of the plurality of prediction linear models. The parameters of the composite linear model may be derived by averaging the parameters of the multiple prediction linear models. The decoder may receive the selection of one of the multiple lines, and the prediction linear model derived from the selected line of neighboring pixels is used as the composite linear model.

The decoder applies (at block 1440) the composite linear model to reconstructed luma samples of the current block to generate a chroma predictor of the current block. The decoder reconstructs (at block 1450) the current block by using the chroma predictor. Specifically, the chroma predictor is added with the chroma prediction residual to produce reconstructed chroma samples of the current bock. The reconstructed chroma samples are provided for display and/stored for reference by subsequent blocks and pictures. In some embodiments, the decoder may post-process the chroma predictor before using the chroma predictor to reconstruct chroma samples of the current block or to encode the current block. In some embodiments, a first region of the current block is decoded by using the chroma predictor and a second region of the current block is decoded by using inter-prediction. In some embodiments, the encoder identifies the first and second regions based on luma residual samples of the current block.

Many of the above-described features and applications are implemented as software processes that are specified as a set of instructions recorded on a computer readable storage medium (also referred to as computer readable medium).

When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
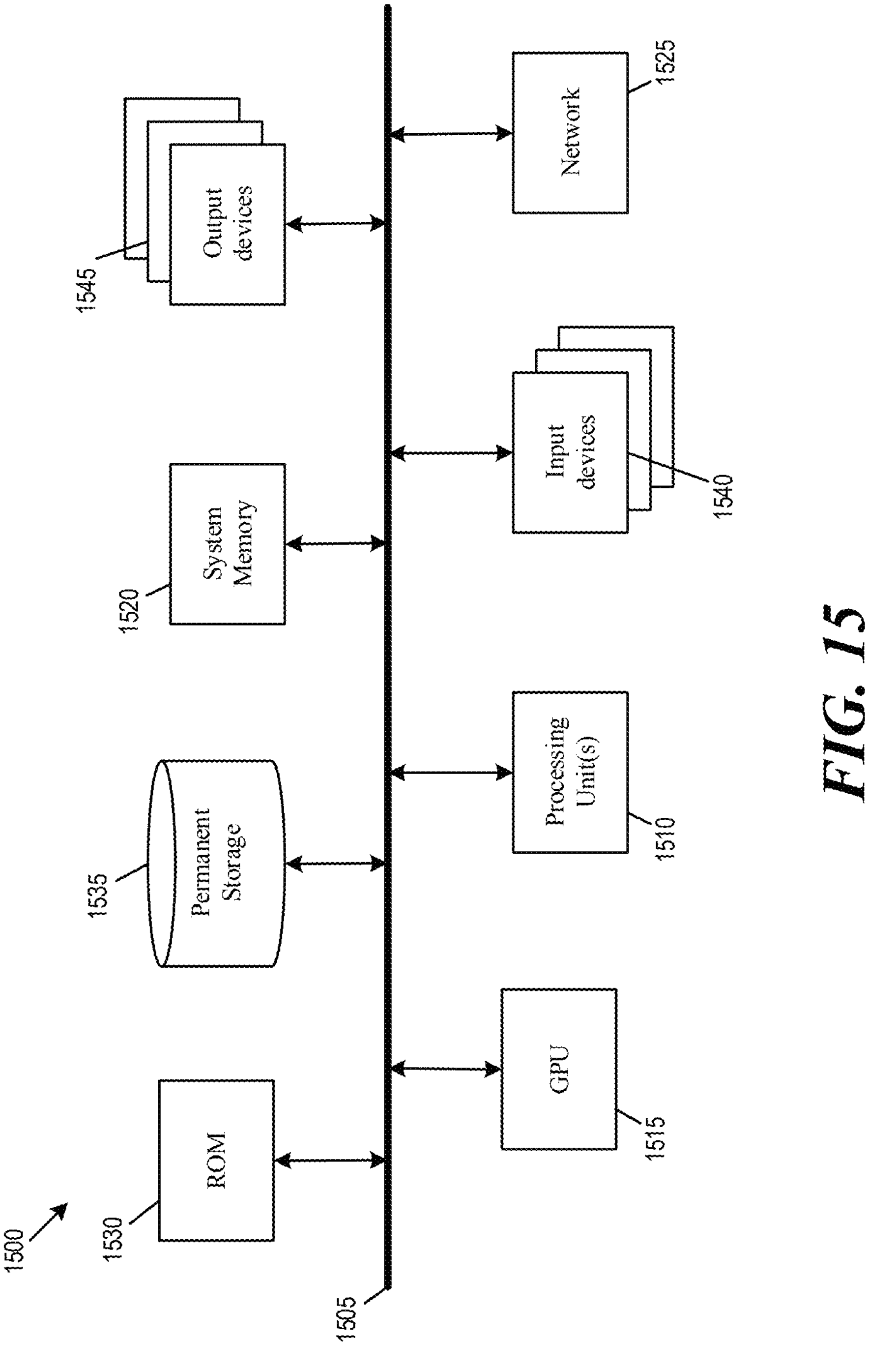
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are used by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor uses at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11 and FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

deriving a plurality of prediction linear models based on luma and chroma samples neighboring the current block;

constructing a composite linear model based on the plurality of prediction linear models;

applying the composite linear model to incoming or reconstructed luma samples of the current block to generate a chroma predictor of the current block; and using the chroma predictor to reconstruct chroma samples of the current block or to encode the current block, wherein the current block comprises a first region and a second region, wherein the first region is reconstructed or encoded by using the chroma predictor and the second region is reconstructed or encoded by using inter-prediction.

2. The video coding method of claim 1, further comprising:

selecting a prediction linear model from the plurality of prediction linear models; and deriving the parameters of the composite linear model based on the selected prediction linear model.

3. The video coding method of claim 2, wherein the selected prediction linear model has a best boundary similarity among the plurality of prediction linear models, wherein the boundary similarity of a prediction linear model is computed by comparing (i) reconstructed chroma samples neighboring the current block and (ii) boundary samples of a chroma predictor produced by the prediction linear model base on the reconstructed luma samples of the current block.

4. The video coding method of claim 1, wherein multiple lines of neighboring pixels of the current block are used to provide samples for deriving the parameters of the composite linear model.

5. The video coding method of claim 4, wherein at least one prediction linear model of the plurality of prediction linear models is derived using one or more lines of the multiple lines of neighboring pixels.

6. The video coding method of claim 4, wherein each line of the multiple lines of neighboring pixels is used to derive one prediction linear model of the plurality of prediction linear models.

7. The video coding method of claim 6, wherein the parameters of the composite linear model are derived by averaging the parameters of the plurality of prediction linear models.

8. The video coding method of claim 6, further comprising signaling or receiving a selection of one of the multiple lines, wherein the prediction linear model derived from the selected line of neighboring pixels is used as the composite linear model.

9. The video coding method of claim 1, wherein pixels are classified into different groups according to pixel magnitudes, wherein the plurality of prediction linear models are correspondingly derived for the different magnitude groups.

10. The video coding method of claim 1, wherein neighboring pixels of the current block are partitioned into a plurality of segments according to a set of segmentation information, and the plurality of prediction linear models comprises linear models that are derived based on the plurality of segments.

11. The video coding method of claim 10, wherein the plurality of prediction linear models comprises a linear model that is derived based on distances to top or left boundaries of the current block.

12. The video coding method of claim 1, wherein the plurality of prediction linear models are constructed for a first chroma component of the current block, wherein only one prediction linear model is constructed for a second chroma component of the current block.

13. The video coding method of claim 1, wherein the parameters of the plurality of prediction linear models are derived based on a plurality of luma blocks.

14. The video coding method of claim 1, wherein the luma and chroma samples neighboring the current block belong to multiple different segments of neighboring pixels, wherein different prediction linear models are derived from luma and chroma samples of different segments of neighboring pixels.

15. The video coding method of claim 1, further comprising:

pre-processing the luma and chroma samples before deriving the plurality of prediction linear models; and post-processing the chroma predictor before using the chroma predictor to reconstruct chroma samples of the current block or to encode the current block.

16. The video coding method of claim 1, wherein the first and second regions are identified based on luma residual sample of the current block.

17. An electronic apparatus comprising:

a video coding circuit configured to perform operations comprising:

receiving data for a block of pixels to be encoded or decoded as a current block of a current picture of a video;

deriving a plurality of prediction linear models based on luma and chroma samples neighboring the current block;

constructing a composite linear model based on the plurality of prediction linear models, wherein the parameters of the composite linear model are derived from the parameters of the plurality of prediction linear models;

applying the composite linear model to incoming or reconstructed luma samples of the current block to generate a chroma predictor of the current block; and using the chroma predictor to reconstruct chroma samples of the current block or to encode the current block, wherein the current block comprises a first region and a second region, wherein the first region is reconstructed or encoded by using the chroma predictor and the second region is reconstructed or encoded by using inter-prediction.

18. A video decoding method comprising:

receiving data for a block of pixels to be decoded as a current block of a current picture of a video;

deriving a plurality of prediction linear models based on luma and chroma samples neighboring the current block;

constructing a composite linear model based on the plurality of prediction linear models, wherein the parameters of the composite linear model are derived from the parameters of the plurality of prediction linear models;

applying the composite linear model to reconstructed luma samples of the current block to generate a chroma predictor of the current block; and using the chroma predictor to reconstruct chroma samples of the current block, wherein the current block comprises a first region and a second region, wherein the first region is reconstructed or encoded by using the chroma predictor and the second region is reconstructed or encoded by using inter-prediction.

* * * * *